(12) United States Patent
Fukukawa et al.

(10) Patent No.: US 7,699,383 B2
(45) Date of Patent: Apr. 20, 2010

(54) PEDESTRIAN PROTECTION APPARATUS FOR VEHICLE

(75) Inventors: Masanobu Fukukawa, Toyota (JP); Yoshihiro Ogura, Toyota (JP); Kaoru Ito, Nisshin (JP); Kuniaki Hasegawa, Kariya (JP); Hiroki Kurokawa, Toyota (JP); Yoshiyuki Yamamoto, Takahama (JP); Naoki Goda, Chiryu (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 12/129,103

(22) Filed: May 29, 2008

(65) Prior Publication Data

US 2008/0258485 A1 Oct. 23, 2008

Related U.S. Application Data

(62) Division of application No. 11/564,377, filed on Nov. 29, 2006, now abandoned.

(30) Foreign Application Priority Data

| Dec. 21, 2005 | (JP) | ............................. 2005-368575 |
| Dec. 28, 2005 | (JP) | ............................. 2005-377664 |

(51) Int. Cl.
    *B60R 21/34* (2006.01)
(52) U.S. Cl. ............................. 296/187.04; 296/187.09; 293/132
(58) Field of Classification Search ............ 296/187.04, 296/187.09; 293/15, 120, 132, 133, 146; 280/770; 180/274

See application file for complete search history.

(56) References Cited

U.S. PATENT DOCUMENTS

| 4,733,894 | A | * | 3/1988 | Lamparter ................... 293/120 |
| 5,984,389 | A | | 11/1999 | Nuber et al. |
| 6,467,822 | B1 | | 10/2002 | Leng |
| 6,540,275 | B1 | * | 4/2003 | Iwamoto et al. ................ 293/24 |
| 6,634,702 | B1 | | 10/2003 | Pleschke et al. |
| 6,659,520 | B2 | | 12/2003 | Bastien et al. |
| 6,755,459 | B2 | | 6/2004 | Thelen et al. |
| 6,886,872 | B2 | * | 5/2005 | Matsumoto et al. .......... 293/115 |
| 6,893,064 | B2 | * | 5/2005 | Satou .......................... 293/132 |

(Continued)

FOREIGN PATENT DOCUMENTS

EP            0 798 197 A1    10/1997

(Continued)

*Primary Examiner*—Glenn Dayoan
*Assistant Examiner*—Gregory Blankenship
(74) *Attorney, Agent, or Firm*—Burr & Brown

(57) ABSTRACT

A pedestrian protection apparatus for a vehicle, including a plate member which is disposed at a front face of the vehicle, which includes front and rear portions, and which is fixed at the rear portion to the vehicle with at least a leading end part of the front portion protruded from the front face of the vehicle, the apparatus being arranged to sweep a leg portion of a pedestrian, thereby protecting the leg portion, wherein the leading end part includes at least one horizontally extending portion and a plurality of vertically extending portions each having an anterior surface substantially orthogonal to a horizontal plane, the horizontally extending portion and the vertically extending portions being formed integrally with the leading end part so as to be alternately disposed in the frontward and backward direction of the vehicle and extend in a staircase-like form.

9 Claims, 12 Drawing Sheets

U.S. PATENT DOCUMENTS

| | | | |
|---|---|---|---|
| 6,971,692 B2 | 12/2005 | Gioia et al. | |
| 7,114,587 B2 * | 10/2006 | Mori et al. | 180/68.3 |
| 7,434,872 B2 * | 10/2008 | Steller | 296/193.09 |
| 7,441,828 B2 * | 10/2008 | Noyori et al. | 296/187.04 |
| 7,481,484 B2 * | 1/2009 | Hirano | 296/187.04 |
| 7,516,994 B2 * | 4/2009 | Ito | 293/133 |
| 7,517,006 B2 * | 4/2009 | Kageyama et al. | 296/187.09 |
| 2002/0125725 A1 * | 9/2002 | Satou | 293/132 |
| 2002/0129981 A1 * | 9/2002 | Satou | 180/68.6 |
| 2003/0192727 A1 * | 10/2003 | Mori et al. | 180/68.4 |
| 2007/0046043 A1 * | 3/2007 | Ito | 293/120 |
| 2007/0085356 A1 * | 4/2007 | Itou et al. | 293/120 |
| 2007/0115205 A1 * | 5/2007 | Uchiyama | 345/7 |
| 2007/0138815 A1 * | 6/2007 | Fukukawa et al. | 293/15 |
| 2007/0284915 A1 * | 12/2007 | Hasegawa et al. | 296/187.04 |
| 2008/0001433 A1 * | 1/2008 | Noyori et al. | 296/187.04 |
| 2008/0093868 A1 * | 4/2008 | Steller | 293/142 |
| 2008/0217959 A1 * | 9/2008 | Noyori et al. | 296/187.04 |
| 2008/0258485 A1 * | 10/2008 | Fukukawa et al. | 296/1.04 |
| 2009/0115205 A1 * | 5/2009 | Steller et al. | 293/115 |

FOREIGN PATENT DOCUMENTS

| | | |
|---|---|---|
| EP | 1 238 862 A2 | 9/2002 |
| EP | 1 266 818 A2 | 12/2002 |
| EP | 1 038 732 B1 | 7/2003 |
| EP | 1 352 810 A2 | 10/2003 |
| JP | 2000-264143 A1 | 9/2000 |
| JP | 2001-071837 A1 | 3/2001 |
| JP | 2001-146140 | 5/2001 |
| JP | 2001-277963 A1 | 10/2001 |
| JP | 2002-274298 A1 | 9/2002 |
| JP | 2004-025976 A1 | 1/2004 |
| JP | 2004-203183 A1 | 7/2004 |
| JP | 2005-001430 | 1/2005 |

* cited by examiner

PEDESTRIAN PROTECTION APPARATUS FOR VEHICLE

CROSS REFERENCE TO RELATED APPLICATIONS

This application is a divisional of U.S. application Ser. No. 11/564,377, filed Nov. 29, 2006, which claims the benefit of Japanese Patent Application No. 2005-368575, filed Dec. 21, 2005, and Japanese Patent Application No. 2005-377664, filed Dec. 28, 2005, the contents of which are incorporated herein by reference.

BACKGROUND OF THE INVENTION

1. Field of the Invention

The present invention relates in general to a pedestrian protection apparatus for a vehicle, and in particular to an improved structure of the pedestrian protection apparatus disposed at a lower part of a front face of the vehicle and arranged to sweep a leg portion of a pedestrian by contact with the leg portion of the pedestrian that has collided with or contacted the front face of the vehicle, thereby protecting the leg portion of the pedestrian.

2. Discussion of Related Art

In vehicles such as automotive vehicles, there are conventionally disposed, at a front face, a rear face, or a side face, of the vehicles, various types of protection apparatus which absorb an impact energy generated upon a collision for thereby protecting a vehicle body and passengers of the vehicle. In recent years, there is disposed, at the front face of the vehicle, an apparatus for protecting a pedestrian upon collision or contact of the pedestrian with the front face of the vehicle.

As one type of the pedestrian protection apparatus, there is known a so-called leg-sweep apparatus which is disposed inside of a front bumper or disposed independently of the front bumper. The leg-sweep apparatus is arranged to apply, to a leg portion of the pedestrian, counterforce with respect to an impact load that is inputted upon collision of the pedestrian with the front face of the vehicle and sweep (scoop up) the leg portion of the pedestrian, thereby causing the pedestrian to fall down or to be thrown over toward the vehicle. Thus, it is possible to minimize occurrence of injuries to the knee such as bone fractures, thereby assuring protection and safety of the pedestrian.

Examples of the leg-sweep apparatus as one type of the pedestrian protection apparatus are disclosed in a patent publication document 1 (JP-A-2001-277963) and a patent publication document 2 (JP-A-2004-25976), for instance. The pedestrian protection apparatus disclosed in the patent publication document 1 is arranged to be disposed at the lower part of the front face of the vehicle and includes resin foam body which extends in a vehicle width direction with at least a part of the resin foam body protruded from the front face of the vehicle and a beam member which extends in the vehicle width direction while being in contact with the back surface of the resin foam body. The pedestrian protection apparatus disclosed in the patent publication document 2 is arranged to be disposed at the lower part of the vehicle and includes a metal pipe or the like which is fixed to the lower part of the front face of the vehicle so as to extend in the vehicle width direction. However, the pedestrian protection apparatus disclosed in those documents have drawbacks which should be rectified. In the former pedestrian protection apparatus including the resin foam body and the beam member, the number of the components is undesirably large, and therefore the cost of the components is high. Further, it is troublesome to install or mount the apparatus on the vehicle. In the latter pedestrian protection apparatus including the metal pipe, the weight of the apparatus inevitably increases. In addition, it is difficult to form into a configuration following that of the front face of the vehicle.

Under such situations, there has been proposed, in a patent publication document 3 (JP-A-2004-203183), for instance, a pedestrian protection apparatus arranged to be disposed to extend in a frontward and backward direction of a vehicle. The disclosed apparatus includes a plate member which is formed of a synthetic resin, which includes a front portion and a rear portion, and which is fixed at the rear portion to the vehicle with at least a leading end part of the front portion protruded from the front face of the vehicle. The pedestrian protection apparatus disclosed in the patent publication document 3 is arranged to sweep a leg portion of a pedestrian that has collided with the front face of the vehicle by contact of the leading end part of the front portion of the plate member protruding from the front face of the vehicle, with the leg portion of the pedestrian. In this conventional pedestrian protection apparatus, there are formed, on one surface of the front portion of the plate member, a plurality of first ribs having a planar shape and extending in the frontward and backward direction of the vehicle and a plurality of second ribs having a planar shape and extending in the width direction of the vehicle, which first and second ribs are assembled in a lattice. In this structure, the front portion of the plate member is reinforced, that is, the rigidity of the front portion of the plate member is increased, owing to the ribs formed thereon.

In such a pedestrian protection apparatus, the number of the components is small. Further, the plate member whose leading end part is protruded from the front face of the vehicle is made of the synthetic resin that is excellent in formability. Accordingly, the disclosed apparatus assures protection of the pedestrian while eliminating the drawbacks of the above-indicated apparatus including the resin foam body and the beam member and the drawbacks of the above-indicated apparatus including the metal pipe. Further, the front portion of the plate member is reinforced, that is, the rigidity of the front portion is increased, by the plurality of first and second ribs formed as described above, whereby, when the front portion of the plate member comes into contact with the leg portion of the pedestrian, the front portion is prevented from being deformed due to impact upon the contact or the deformation amount of the front portion is made sufficiently small. Therefore, it is possible to stably assure counterforce with respect to the impact load inputted to the plate member.

However, the conventional pedestrian protection apparatus having the plate member formed of the synthetic resin experiences the following drawbacks.

The above-described pedestrian protection apparatus is generally disposed inside of the front bumper such that the planar second ribs provided on the front portion of the plate member are opposed to the inner surface of the front bumper. The cross sectional shape of the front bumper taken along a vertical plane which is parallel to the frontward and backward direction of the vehicle is a convex curved shape protruding forward. Where the inner surface of the front bumper has a convex curved surface configuration in correspondence with the shape of the front bumper, there is inevitably formed a comparatively large clearance between the inner surface of the front bumper and the planar second ribs of the plate member.

Further, in the pedestrian protection apparatus described above, in general, the leading end part of the front portion of the plate member is positioned so as to protrude from the front face of the vehicle with the rear portion of the plate member fixed to a radiator support, a cross member or the like. Accordingly, the dimension of the plate member as measured in the frontward and backward direction of the vehicle is relatively large. The increase in the dimension of the plate member as measured in the frontward and backward direction of the vehicle, however, leads to insufficient rigidity (insufficient strength with respect to deformation) against the impact load inputted thereto upon collision of the leg portion of the pedestrian with the front face of the vehicle. Where the flexural or bending rigidity of the plate member is insufficient, the front portion of the plate member is initially deflected or bent with ease, so that the timing of initial rise of the impact load in the load characteristics (abrupt rise of the load in the load-displacement curve) is delayed, thereby making it impossible to instantaneously exhibit sufficient counterforce with respect to the impact load. In this case, the pedestrian protection apparatus fails to instantaneously or promptly sweep the leg portion of the pedestrian.

In the meantime, as the pedestrian protection apparatus which is to be disposed inside of the front bumper with the leading end part of the front portion of the plate member opposed to the inner surface of the front bumper having the convex curved surface configuration, there is known a structure that the surface of the leading end part of the plate member that confronts the inner surface of the front bumper is made as a convex curved surface corresponding to the inner surface of the front bumper, as disclosed in a patent publication document 4 (JP-A-2002-274298), for instance. The disclosed structure prevents formation of a large clearance between the leading end part of the plate member and the inner surface of the front bumper.

In the pedestrian protection apparatus having such a structure, however, the impact load that acts in a backward direction of the vehicle when the leg portion of the pedestrian collides with the front bumper is inputted to the convex curved surface of the leading end part of the plate member. Accordingly, upon the input of the impact load, there is a generated force that lifts up the leading end part of the plate portion. In this instance, the leading end part of the plate member is deformed so as to be rolled up, resulting in a delay in the rise of the impact load in the load characteristics. Accordingly, the pedestrian protection apparatus in which the leading end part of the plate member has a shape that corresponds to the shape of the inner surface of the front bumper also suffers from the problem that the leg portion of the pedestrian cannot be promptly swept.

SUMMARY OF THE INVENTION

The present invention has been developed in the light of the aforementioned situations. It is therefore an object of the invention to provide a pedestrian protection apparatus for a vehicle capable of sufficiently protecting a leg portion of a pedestrian that has collided with a front face of the vehicle by promptly and reliably sweeping the leg portion of the pedestrian.

The above-indicated object of the invention may be attained according to a first aspect of the invention, which provides a pedestrian protection apparatus for a vehicle, comprising a plate member which is disposed at a lower part of a front face of the vehicle so as to extend in a frontward and backward direction of the vehicle, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, wherein the leading end part of the front portion of the plate member includes at least one horizontally extending portion each of which extends horizontally in the frontward and backward direction of the vehicle and a plurality of vertically extending portions each of which has an anterior surface substantially orthogonal to a horizontal plane and each of which extends in a vertical direction, the at least one horizontally extending portion and the plurality of vertically extending portions being formed integrally with the leading end part such that each of the at least one horizontally extending portion and each of the plurality of vertically extending portions are alternately disposed in the frontward and backward direction of the vehicle so as to extend in a staircase-like form, whereby the leading end part has a staircase-like portion constituted by the at least one horizontally extending portion and the plurality of vertically extending portions.

The "horizontally extending" state mentioned in the present specification is not strictly limited to a state of extending straightly in a horizontal direction, but includes a state of extending while inclining with respect to the horizontal direction by a slight angle. Similarly, the "vertically extending" state is not strictly limited to a state of extending straightly in a vertical direction, but includes a state of extending while inclining with respect to the vertical direction by a slight angle. Further, "an anterior surface substantially orthogonal to a horizontal plane" includes both of a flat surface or a curved surface formed by a moving path of a vertical line and a flat surface or a curved surface formed by a moving path of a straight line that is inclined with respect to the vertical direction by a slight angle. Hereinafter, these terms are used in the respective meanings described above.

In the pedestrian protection apparatus constructed according to the above-indicated first aspect of the invention, the impact load generated accompanied by the collision of the leg portion of the pedestrian is inputted, at the leading end part of the plate member, substantially perpendicularly to the anterior surface of each of the plurality of vertically extending portions in the staircase-like portion. Accordingly, unlike the conventional apparatus in which the front face of the leading end part of the plate member is made as a convex curved surface corresponding to the inner surface of the front bumper whose vertical cross sectional shape is the above-described convex curved shape, the present apparatus does not suffer from force that lifts up the leading end part of the plate member upon inputting of the impact load thereto, so that it is possible to advantageously eliminate or restrain the delay of the rise of the impact load in the load characteristics due to occurrence of deformation of the leading end part of the plate member so as to be rolled up. In addition, upon the collision with the leg portion of the pedestrian, the area of the leading end part of the plate member which comes into contact with the leg portion of the pedestrian can be made large. Consequently, the impact load can be reliably and sufficiently inputted to the leading end part of the plate member, allowing larger counterforce to be exhibited.

In the present apparatus, a part of or an entirety of the leading end part of the plate member is formed by the staircase-like portion constituted by the plurality of vertically extending portions and the at least one horizontally extending portion. According to the arrangement, at the leading end part of the plate member, the plurality of vertically extending portions are located at mutually different height levels in the forward and backward direction with each of the at least one horizontally extending portion being interposed between adjacent two of the plurality of vertically extending portions. Therefore, even where the leading end part of the plate member is deposed inside of the front bumper whose vertical cross sectional shape is the curved convex shape, such that the leading end part of the plate member is opposed to the inner surface of the front bumper having the curved convex shape, the clearance formed between the inner surface of the front bumper and the anterior surface of each vertically extending portion can be minimized.

Because the staircase-like portion includes the at least one horizontally extending portion, there are formed portions extending in a direction in which the impact load is inputted (i.e., horizontal portions extending in the horizontal direction that is the frontward and backward direction of the vehicle) at a plural locations of the plate member such that those portions have mutually different height levels. Accordingly, the counterforce with respect to the impact load can be sufficiently exhibited at the plurality of locations. Moreover, the portions of the plate portion that extend in the input direction of the impact load are in a divided state, so that moment arm in the plate member can be advantageously shortened, thereby reducing rotation force generated in the plate member upon inputting of the impact thereto. Therefore, it is possible to prevent, with high reliability, the leading end part of the plate member from being deformed or rolled up, resulting in a prompt rise of the impact load in the load characteristics.

In the pedestrian protection apparatus constructed as described above, it is possible to promptly and reliably sweep, with sufficient counterforce, the leg portion of the pedestrian that has collided with the front face of the vehicle even when the apparatus is disposed independently of the front bumper and even when the apparatus is disposed inside of the front bumper whose vertical cross sectional shape is the convex curved shape. As a result, the present apparatus is capable of sufficiently protecting the leg portion of the pedestrian at a higher level.

Because the present pedestrian protection apparatus permits a prompt rise of the impact load in the load characteristics, the impact load reaches a target value quickly. Accordingly, the present pedestrian protection apparatus effectively assures a sufficient amount of the impact-absorbing stroke accompanied by buckling deformation of the horizontally extending portion after the impact load in the load characteristics has reached the target value.

The above-indicated object of the present invention may also be attained according to a second aspect of the invention, which provides a pedestrian protection apparatus for a vehicle, comprising a plate member which is disposed at a lower part of a front face of the vehicle so as to extend in a frontward and backward direction of the vehicle with a suitable width, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, wherein the plate member includes: a horizontally extending portion which is located at the leading end part of the front portion of the plate member so as to horizontally extend over an entire width of the plate member; a front-side vertically extending portion which is formed integrally with a front end of the horizontally extending portion so as to extend in a vertical direction; a rear-side vertically extending portion which is formed integrally with a rear end of the horizontally extending portion so as to extend in the vertical direction such that the rear-side vertically extending portion is opposed to the front-side vertically extending portion with a suitable distance interposed therebetween; and a connecting portion which is constituted by a proximal end part of the front portion of the plate member that extends in the frontward and backward direction on the back side of the rear-side vertically extending portion and which connects, integrally to the rear portion of the plate member, a posterior surface of the rear-side vertically extending portion at a point thereof having a height position different from a height position of a connecting point of an anterior surface of the rear-side vertically extending portion at which the rear-side vertically extending portion is connected to the horizontally extending portion, and wherein the front portion of the plate member is constituted by including, at the leading end part thereof, a U-shaped portion having a U-shaped configuration in vertical cross section.

Concerning the "horizontally extending" state and the "vertically extending" state, the explanation made above with respect to the first aspect is applicable.

In the pedestrian protection apparatus constructed according to the above-indicated second aspect of the invention, the U-shaped portion provided at the leading end part of the front portion of the plate member functions as a bead that reinforces the front portion of the plate member. Accordingly, even when the entire length of the plate member (i.e., the dimension of the plate member as measured in the frontward and backward direction of the vehicle) is relatively large, it is possible to sufficiently assure bending or flexural strength of the front portion, in particular, the rigidity (the strength with respect to deformation) against the impact load inputted thereto upon the collision of the leg portion of the pedestrian with the front face of the vehicle. Therefore, the front portion of the plate member is advantageously prevented from easily deflected upon inputting of the impact load.

In the pedestrian protection apparatus constructed according to the above-indicated second aspect of the invention, when the leg portion of the pedestrian comes into contact with the leading end part of the front portion of the plate member as a result of collision of the leg portion against the front face of the vehicle, the front-side vertically extending portion is deformed so as to be inclined with respect to the vertical direction by a suitable angle while the horizontally extending portion is displaced backward. Further, the rear-side vertically extending portion is deformed so as to be inclined with respect to the vertical direction by a suitable angle. Accordingly, the impact load is designed to be gradually transmitted from the front portion to the rear portion of the plate member. In this instance, since the front-side and the rear-side vertically extending portions are formed to extend in the vertical direction over the entire width of the plate member, those front-side and rear-side vertically extending portions are deformed over a wide range in the width direction of the plate member (i.e., in the vehicle width direction), whereby the impact load can be effectively transmitted also in the width direction of the plate member. As a result, the impact load is advantageously distributed in the front portion of the plate member, so that the leading end part of the plate member is effectively prevented from being easily deflected.

Moreover, in the present apparatus, the impact load generated by the collision of the leg portion of the pedestrian is inputted substantially perpendicularly with respect to the front-side vertically extending portion located at the leading end part of the plate member. According to the arrangement, there is generated no force that lifts up the leading end part of the plate member upon inputting of the impact load thereto, thereby effectively preventing the leading end part of the plate member from being deformed, i.e., rolled up.

Thus, in the pedestrian protection apparatus constructed according to the second aspect of the invention, the front portion of the plate member is effectively prevented from being easily deformed or deflected by the impact load, arising from insufficient rigidity with respect to the impact load, concentration of stress of the impact load, the configuration of the leading end part of the plate portion, and the like. As a result, the delay of the rise of the impact load in the load characteristics can be obviated.

The pedestrian protection apparatus constructed as described above permits a prompt rise of the impact load in the load characteristics and thereby instantaneously exhibits a sufficient degree of counterforce with respect to the impact load. Consequently, the present pedestrian protection apparatus is capable of promptly and reliably sweeping the leg portion of the pedestrian which collided with the front face of the vehicle, thereby protecting the leg portion with higher reliability.

Because the present pedestrian protection apparatus permits a prompt rise of the impact load in the load characteristics as described above, the impact load reaches a target value more quickly. Accordingly, the present pedestrian protection apparatus effectively assures a sufficient amount of the impact-absorbing stroke is accompanied by buckling deformation of the horizontally extending portion after the impact load in the load characteristics has reached the target value.

The present invention is preferably practiced in at least the following forms.

(1) A pedestrian protection apparatus for a vehicle, comprising a plate member which is disposed at a lower part of a front face of the vehicle so as to extend in a frontward and backward direction of the vehicle, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, where the leading end part of the front portion of the plate member includes at least one horizontally extending portion each of which extends horizontally in the frontward and backward direction of the vehicle and a plurality of vertically extending portions each of which has an anterior surface substantially orthogonal to a horizontal plane and each of which extends in a vertical direction, the at least one horizontally extending portion and the plurality of vertically extending portions being formed integrally with the leading end part such that each of the at least one horizontally extending portion and each of the plurality of vertically extending portions are alternately disposed in the frontward and backward direction of the vehicle so as to extend in a staircase-like form, whereby the leading end part has a staircase-like portion constituted by the at least one horizontally extending portion and the plurality of vertically extending portions.

(2) The apparatus according to the above form (1), where a forward end of the staircase-like portion is constituted by one of the plurality of vertically extending portions, and one of vertically opposite ends of the one of the plurality of vertically extending portions that is nearer to one of the at least one horizontally extending portion which is adjacent to the one of the plurality of vertically extending portions is located at a middle portion of the staircase-like portion (including the vicinity of the middle portion) in a height direction thereof.

According to the above-indicated form (2), upon collision of the leg portion of the pedestrian against the front face of the vehicle, the leg portion is initially brought into contact with the front end of the horizontally extending portion located at the middle portion of the staircase-like portion in its height direction. Accordingly, the impact load acts, with high reliability, on the leading end part of the plate member in the horizontal direction, whereby the leading end part of the plate member is more effectively prevented from being deformed or rolled up. As a result, the leg portion of the pedestrian can be more efficiently and reliably protected.

(3) The apparatus according to the above form (1), wherein a forward end of the staircase-like portion is constituted by one of the at least one horizontally extending portion.

According to the above-indicated form (3), when the present pedestrian protection apparatus is disposed inside of the front bumper having the convex curved configuration in the vertical cross section, a clearance between the inner surface of the front bumper and the leading end part of the plate member can be made small, thereby effectively assuring a prompt rise of the impact load in the load characteristics. Hence, the protection of the leg portion of the pedestrian can be realized at a higher level.

(4) The apparatus according to any one of the above forms (1)-(3), wherein reinforcing ribs for reinforcing the front portion of the plate member are formed on a part of the front portion that at least includes the staircase-like portion, such that the reinforcing ribs are integral with posterior surfaces of the plurality of vertically extending portions in the staircase-like portion, so as to extend in the frontward and backward direction of the vehicle.

According to the above-indicated form (4), the rigidity of the front portion of the plate member can be advantageously increased, thereby permitting the counterforce with respect to the impact load to be sufficiently exhibited. In consequence, the function of protecting the leg portion of the pedestrian can be effectively enhanced. Further, by adjusting the number, the location, etc., of the reinforcing ribs which are provided on the part of the front portion of the plate member that at least includes the staircase-like portion, the rigidity of the front portion of the plate member can be suitably changed, whereby the amount of buckling deformation of the front portion of the plate member accompanied by the input of the impact load can be easily tuned depending upon the magnitude of the impact load to be inputted.

(5) A pedestrian protection apparatus for a vehicle, comprising a plate member which is disposed at a lower part of a front face of the vehicle so as to extend in a frontward and backward direction of the vehicle with a suitable width, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, where the plate member includes: a horizontally extending portion which is located at the leading end part of the front portion of the plate member so as to horizontally extend over an entire width of the plate member; a front-side vertically extending portion which is formed integrally with a front end of the horizontally extending portion so as to extend in a vertical direction; a rear-side vertically extending portion which is formed integrally with a rear end of the horizontally extending portion so as to extend in the vertical direction such that the rear-side vertically extending portion is opposed to the front-side vertically extending portion with a suitable distance interposed therebetween; and a connecting portion which is constituted by a proximal end part of the front portion of the plate member that extends in the frontward and backward direction on the back side of the rear-side vertically extending portion and which connects, integrally to the rear portion of the plate member, a posterior surface of the rear-side vertically extending portion at a point thereof having a height position different from a height position of a connecting point of an anterior surface of the rear-side vertically extending portion at which the rear-side vertically extending portion is connected to the horizontally extending portion, and where the front portion of the plate member is constituted by including, at the leading end part thereof, a U-shaped portion having a U-shaped configuration in vertical cross section.

(6) A pedestrian protection apparatus for a vehicle, comprising a plate member which is disposed at a lower part of a front face of the vehicle so as to extend in a frontward and backward direction of the vehicle with a suitable width, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, where the plate member includes: a front-side vertically extending portion which is located at the leading end part of the front portion of the plate member so as to vertically extend over an entire width of the plate member; a plurality of rear-side vertically extending portions which are located at the back of the front-side vertically extending portion with a suitable distance interposed therebetween so as to extend in the vertical direction over the entire width of the plate member such that the plurality of rear-side vertically extending portions are opposed to the front-side vertically extending portion and spaced apart from each other by a suitable distance in the frontward and backward direction; a plurality of horizontally extending portions which are located between mutually corresponding vertical ends of a forwardmost one of the plurality of rear-side vertically extending portions and the front-side vertically extending portion and between mutually corresponding vertical ends of the plurality of rear-side vertically extending portions, such that the plurality of horizontally extending portions horizontally extend over the entire width of the plate member and such that two adjacent of the plurality of horizontally extending portions in the frontward and backward direction are located at mutually different height levels, thereby connecting the front-side vertically extending portion and the forwardmost one of the plurality of rear-side vertically extending portions integrally to each other and connecting the plurality of rear-side vertically extending portions to each other; and a connecting portion which is constituted by a proximal end part of the front portion of the plate member that is located on the back side of a rearmost one of the plurality of rear-side vertically extending portions so as to extend in the frontward and backward direction and which connects, integrally to the rear portion of the plate member, a posterior surface of the rearmost one of the plurality of rear-side vertically extending portions at a point thereof having a different height position from that of a connecting point of an anterior surface of the rearmost one of the plurality of vertically extending portions at which the rearmost one of the plurality of vertically extending portions is connected to a corresponding one of the plurality of horizontally extending portions, and where the leading end part of the front portion of the plate member extends in a zigzag form in a height direction with a U-shaped configuration in vertical cross section.

According to the above-indicated form (6), the leading end part of the front portion of the plate member has a U-shaped configuration in vertical cross section and is made as a zigzag portion in which the U-shaped portion functioning bead is continuously formed in the frontward and backward direction. Accordingly, the rigidity with respect to the impact load can be advantageously increased at the front portion of the plate member. Further, the present apparatus includes, in addition to the front-side vertically extending portion to which the impact load is inputted substantially perpendicularly, the plurality of horizontally extending portions which are displaced backward upon inputting of the impact load and the plurality of rear-side vertically extending portions which are deformed so as to be inclined with respect to the vertical direction by a prescribed angle. Accordingly, the impact load can be more sufficiently transmitted toward the width direction of the plate member and effectively distributed.

The above-indicated form (6), therefore, permits a prompt rise of the impact load in the load characteristics, so that sufficient counterforce with respect to the impact load can be exhibited at an earlier time. As a result, the leg portion of the pedestrian collided with the front face of the vehicle can be instantaneously and reliably swept, assuring further enhanced performance of protecting the leg portion of the pedestrian.

Because the above-indicated form (6) permits a prompt rise of the impact load in the load characteristics, the impact load can reach a target value quickly, thereby effectively assuring a sufficient amount of the impact-absorbing stroke accompanied by buckling deformation of the horizontally extending portion after the impact load in the load characteristics has reached the target value.

(7) The apparatus according to the above form (5) or (6), wherein the front-side vertically extending portion is bent at substantially right angles at a plurality of locations of a middle portion thereof as seen in a height direction thereof, so as to extend in the vertical direction in a staircase-like form.

According to the above-indicated form (7), there are formed portions that extend horizontally, at a plurality of locations of a staircase-like portion located at the leading end part of the front portion of the plate member, such that those portions are in a divided state. Accordingly, the moment arm in front portion of the plate member can be advantageously shortened, thereby reducing rotation force generated in the front portion of the plate member upon inputting of the impact thereto. Therefore, it is possible to prevent, with high reliability, the front portion of the plate member from being easily deflected, resulting in a prompt rise of the impact load in the load characteristics.

Further, according to the above-indicated form (7), the plurality of portions which extend horizontally and which are provided at the leading end part of the plate member are located at mutually different height levels in the frontward and backward direction. Therefore, where the present pedestrian protection apparatus is disposed inside of the front bumper having the convex curved configuration in vertical cross section such that the leading end part of the front portion of the plate member is opposed to the inner surface of the front bumper constituted by the convex curved surface, it is possible to minimize a clearance formed between the inner surface of the front bumper and the front face of the leading end part of the plate member. Therefore, it is possible to effectively eliminate or restrain the delay of the rise of the impact load in the load characteristics arising from the presence of the clearance between the inner surface of the front bumper and the leading end part of the plate member.

Accordingly, the above-indicated form (7) permits sufficient counterforce with respect to the impact load to be exhibited instantaneously, so that the leg portion of the pedestrian collided with the front face of the vehicle can be promptly and reliably swept, assuring advantageous enhanced performance of protection of the leg portion of the pedestrian.

(8) The apparatus according to any one of the above forms (5)-(7), wherein reinforcing portions for increasing strength of the front portion of the plate member is provided on the front portion, so to prevent easy deformation of the front portion due to an impact load applied thereto resulting from collision of the leg portion of the pedestrian with the front face of the vehicle.

According to the above-indicated form (8), it is possible to effectively eliminate or restrain easy deflection of the front portion of the plate member by the impact load arising from insufficient rigidity with respect to the impact load. As a result, the above-indicated form (8) effectively realizes a prompt rise of the impact load in the load characteristics and improvement of the function of protecting the leg portion of the pedestrian.

(9) The apparatus according to the above form (8), wherein the reinforcing portions are constituted by reinforcing ribs formed integrally on the front portion of the plate member such that the reinforcing ribs are integral with a posterior surface of the front-side vertically extending portion and posterior surfaces of the plurality of rear-side vertically extending portions, so as to extend in the frontward and backward direction.

According to the above-indicated form (9), the reinforcing portions exhibiting excellent characteristics indicated above are easily formed by molding using metallic dies, Accordingly, the reinforcing portions are advantageously realized in a comparatively simple and moderate structure without increasing the number of the components. Further, by adjusting the installation structure (i.e., the number and the location) of the reinforcing ribs provided on the front portion of the plate member, the rigidity of the front portion of the plate member can be suitably changed, thereby making it possible to easily tune the amount of the buckling deformation of the front portion of the plate member accompanied by the input of the impact load and the amount of absorption of the impact energy based on the buckling deformation of the front portion, depending upon the magnitude of the impact load to be inputted.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

To further clarify the present invention, there will be described in detail embodiments of the invention with reference to the accompanying drawings.

Figure 1:
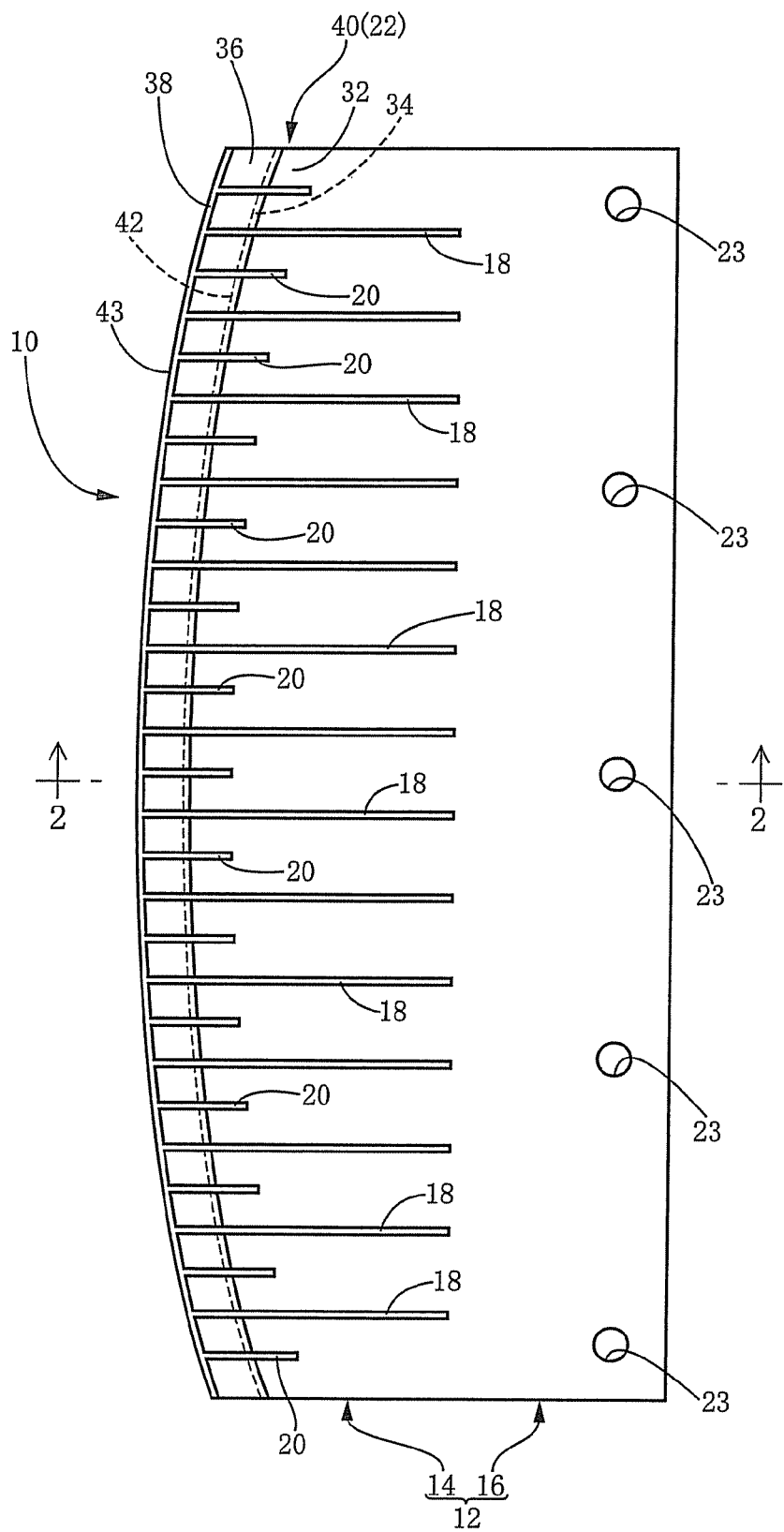
FIG. 1 is a top plan view showing a pedestrian protection apparatus constructed according to a first embodiment of the invention.
Figure 2:
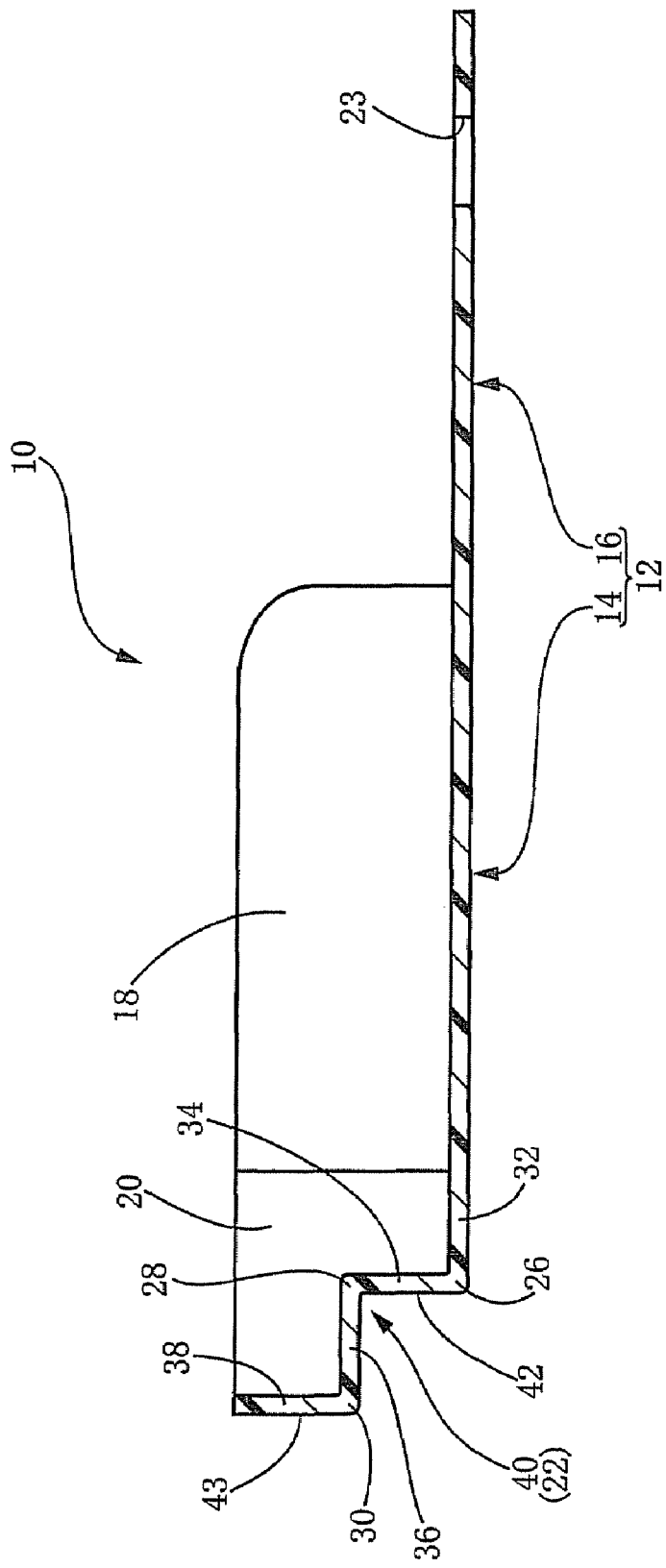
FIG. 2 is a cross sectional view taken along line 2-2 of FIG. 1.

Referring first to the plan view of FIG. 1 and the vertical cross sectional view of FIG. 2, there is schematically shown a leg-sweep apparatus as a pedestrian protection apparatus constructed according to a first embodiment of the present invention. The leg-sweep apparatus generally indicated at 10 in FIGS. 1 and 2 is arranged to be installed inside of a front bumper which is disposed at a front face of an automotive vehicle. As apparent from FIGS. 1 and 2, the present leg-sweep apparatus 10 includes a base plate 12 as a plate member.

The base plate 12 is formed of a synthetic resin material such as polypropylene or ABS resin and is constituted by a thin planar plate having a generally rectangular shape. In the base plate 12, the dimension as measured in a vertical direction of FIG. 1, i.e., the dimension as measured in a vehicle width direction or a leftward and rightward (lateral) direction of the vehicle under installation of the leg-sweep apparatus 10 on the vehicle, is made smaller than the vehicle width by a suitable amount, and the dimension as measured in a transverse direction of FIG. 1, i.e., the dimension as measured in a frontward and backward direction of the vehicle (a vehicle length or running direction), is made sufficiently smaller than the above-indicated dimension as measured in the leftward and rightward direction.

The base plate 12 includes a front portion 14 which occupies a substantially front half region thereof and a rear portion 16 which occupies a substantially rear half region thereof. The front portion 14 of the base plate 12 has, on its upper surface, a plurality of first reinforcing rigs 18 (here, fourteen ribs 18) each of which is a thin planar plate and which are formed integrally with the front portion 14 such that each first reinforcing rib 18 continuously and straightly extends with a constant height from a forward end of the front portion 14 toward a backward end thereof over the entire length of the front portion 14 as measured in the frontward and backward direction. The first reinforcing ribs 18 are opposed to and spaced apart from each other by a suitable constant distance and located parallel to each other, in the leftward and rightward direction.

At a leading end (front end) part 22 of the upper surface of the front portion, 14, there are provided, in addition to front-side parts of the respective first reinforcing ribs 18, a plurality of second reinforcing ribs 20 (here, fifteen ribs 20) each having the same thickness and height as those of the first reinforcing ribs 18 and having a length shorter than that of the first reinforcing ribs 18. The second reinforcing ribs 20 each of which is a thin planar plate are formed integrally with the leading end part 22 so as to continuously and straightly extend in the frontward and backward direction such that each second reinforcing rib 20 is interposed between adjacent two of the first reinforcing ribs 18 that are opposed to each other. The second reinforcing ribs 20 are located parallel to the first reinforcing ribs 18 adjacent thereto. Further, any adjacent two of the second reinforcing ribs 20 which sandwich a corresponding one of the first reinforcing ribs 18 therebetween are located parallel to each other.

The rear portion 16 of the plate base plate 12 has flat upper and lower surfaces on which no reinforcing ribs 18, 20 are formed. At one end of the rear portion 16 remote from the front portion 14, a plurality of insertion holes 23 (here, five insertion holes 23) into each of which a suitable fixing bolt is insertable are formed through the thickness of the rear portion 16 such that the insertion holes 23 are spaced apart from each other by a suitable distance in the leftward and rightward direction.

Figure 3:
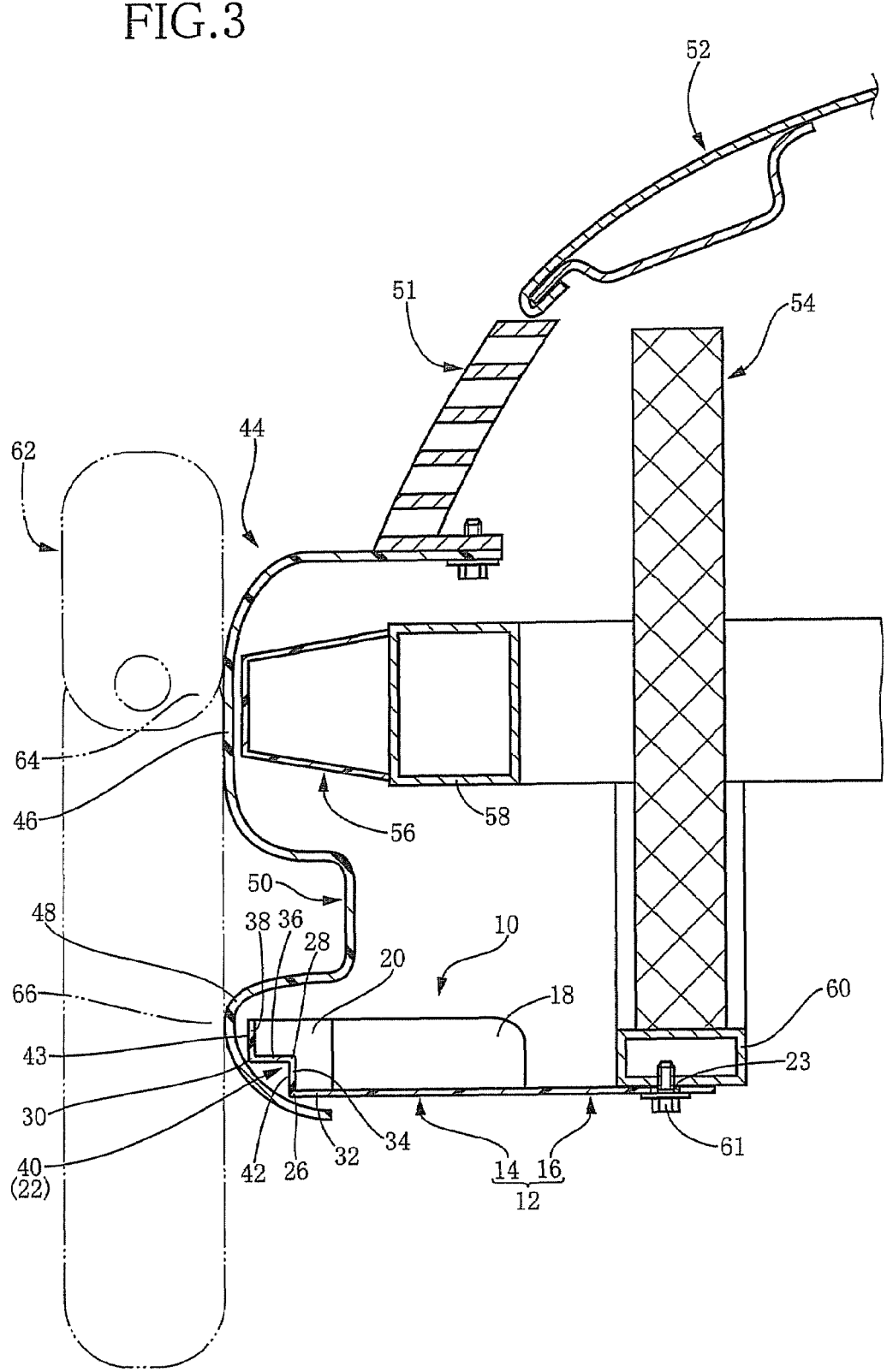
FIG. 3 is an explanatory view showing a state in which the pedestrian protection apparatus of FIG. 1 is installed on a vehicle.

In the exemplary first embodiment, the leg-sweep apparatus 10 is attached, at its rear portion 16, to a prescribed portion of the vehicle so as to be positioned horizontally, as shown in FIG. 3. The front portion 14 of the base plate 12 on which the reinforcing ribs 18, 20 are formed has a higher degree of rigidity with respect to bending or flexural load, i.e., a higher degree of deformation strength with respect to the impact load inputted thereto in the frontward and backward direction in a state in which the leg-sweep apparatus 10 is installed on the vehicle, than that of the rear portion 16 on which no reinforcing ribs 18, 20 are formed. In such a front portion 14, the leading end part 22 on which are formed both of the front-side parts of the respective first reinforcing ribs 18 and the second reinforcing ribs 20 is constructed to have a higher degree of rigidity than the rest of the front portion 14 other than the leading end part 22.

In the present leg-sweep apparatus 10, in particular, the leading end part 22 of the front portion 14 of the base plate 12 on which are formed the second reinforcing ribs 20 has a special structure not found in conventional apparatus.

Namely, the leading end part 22 of the front portion 14 of the base plate 12 is in a bent form obtained by bending a flat plate extending straightly in the frontward and backward direction, at right angles in the frontward and backward direction at three locations that are spaced apart from each other by a prescribed distance in the frontward and backward direction over the entire width thereof. In such a bent form, the leading end part 22 is formed with first, second and third bends 26, 28, 30 in order as seen from the front side, as shown in FIG. 2.

In the thus configured leading end part 22 of the base plate 12, a portion thereof located behind the first bend 26 is made as a first horizontally extending portion 32 that extends horizontally and straightly in the frontward and backward direction under installation of the leg-sweep apparatus 10 on the vehicle. A portion of the leading end part 22 between the first bend 26 and the second bend 28 extends upright at right angles from the front end of the first horizontally extending portion 32 and is made as a first vertically extending portion 34 that extends straightly in the vertical direction under installation of the leg-sweep apparatus 10 on the vehicle. A portion of the leading end part 22 between the second bend 28 and the third bend 30 is bent at right angles from the upper end of the first vertically extending portion 34 and is made as a second horizontally extending portion 36 that horizontally and straightly extend in the frontward and backward direction under installation of the leg-sweep apparatus 10 on the vehicle. A portion of the leading end part 22 located forward of the third bend 30 (i.e., the forward end of the leading end part 22) extends upright at right angles from the front end of the second horizontally extending portion 36 and is made as a second vertically extending portion 38 that extends straightly in the vertical direction under installation of the leg-sweep apparatus 10 on the vehicle.

In other words, in the leading end part 22 of the front portion 14 of the base plate 12, the second vertically extending portion 38 and the first vertically extending portion 34 are respectively located on the front side and the back side of the second horizontally extending portion 36 with the same 36 interposed therebetween, such that the former 38 is located at a height position higher than that of the latter 34. The second horizontally extending portion 36 and the first horizontally extending portion 32 are respectively located on the front side and the back side of the first vertically extending portion 34 with the same 34 interposed therebetween, such that the former 36 is located at a height position higher than that of the latter 32. These extending portions 32-38 are connected integrally to each other at the three bends 26-30.

Thus, in the leading end part 22 of the front portion 14 of the base plate 12, each of the first and second horizontally extending portions 32, 36 and each of the first and second vertically extending portions 34, 38 are alternately disposed in the frontward and backward direction so as to extend in a staircase-like form, whereby the entirety of the leading end part 22 is made as a staircase-like portion 40 constituted by the first and second horizontally extending portions 32, 36 and the first and second vertically extending portions 34, 38.

In the thus formed staircase-like portion 40, the anterior surface of the first vertically extending portion 34 and the anterior surface of the second vertically extending portion 38 are respectively made as load-input surfaces 42, 43 to which the impact load generated by the collision of the leg portion of the pedestrian is to be inputted. Each of the load-input surfaces 42, 43 extends straightly in the vertical direction and has a curved surface configuration obtained by deflecting or warping a vertical plane which is right-angled with respect to a horizontal plane that includes the direction of input of the impact load generated by the collision of the leg portion of the pedestrian, such that the vertical plane is gradually curved backward from the middle portion thereof as seen in the leftward and rightward direction toward the opposite end portions thereof as seen in the same direction. Namely, each of the load-input surfaces 42, 43 is constituted as a convex curved surface which protrudes forward and which is formed by a path that is obtained by moving a vertical line so as to draw an arc.

Because the first and second vertically extending portions 34, 38 are disposed as mentioned above, the load-input surface 43 of the second vertically extending portion 38 is located above the load-input surface 42 of the first vertically extending portion 34 at a location away from the load-input surface 42 in the forward direction by a distance corresponding to the length of the second horizontally extending portion 36 as measured in the frontward and backward direction of the vehicle.

Here, the first and second vertically extending portions 34, 38 have the same height (i.e., the same dimension as measured in the direction of extension thereof), whereby the first and second vertically extending portions 34, 38 have substantially the same area. Further, the lower end of the second vertically extending portion 38, i.e., the third bend 30 as the front end of the second horizontally extending portion 36 interposed between those two vertically extending portions 34, 38 is located at the substantially middle of the staircase-like portion 40 in the height direction thereof.

The first reinforcing ribs 18 and the second reinforcing ribs 20 provided on the front portion 14 of the base plate 12 are formed integrally with the back surfaces of the load-input surfaces 42, 43 of the respective first and second vertically extending portions 34, 38 and the upper surfaces of the respective first and second horizontally extending portions 32, 36.

The thus constructed leg-sweep apparatus 10 is disposed inside of a front bumper 44 installed on the front face of the vehicle, as shown in FIG. 3, for example.

The front bumper 44 inside of which is disposed the leg-sweep apparatus 10 has a bumper cover 50 including an upper protruding portion 46 and a lower protruding portion 48 which protrude from the front face of the vehicle in a state in which the front bumper 44 is installed on the front face of the vehicle. Each of the upper and lower protruding portions 46, 48 has, in vertical cross section, a convex curved surface configuration protruding forward. The bumper cover 50 of the front bumper 44 is fixed by bolts or the like to a front grille 51, for instance, that constitutes the front face portion of the vehicle. In FIG. 3, the reference numerals 52, 54 denote a bonnet and a radiator, respectively.

A known impact or shock-absorbing member 56 whose rigidity is smaller than that of the leg-sweep apparatus 10 is disposed inside of the upper protruding portion 46 of the bumper cover 50 installed on the front face of the vehicle such that the impact-absorbing member 56 is fixedly interposed between the upper protruding portion 46 and a bumper reinforcement 58 as a rigid member while the leg-sweep apparatus 10 is disposed inside of the lower protruding portion 48 of the bumper cover 50.

More specifically described, the leg-sweep apparatus 10 is disposed inside of the lower protruding portion 48 of the bumper cover 50 such that the staircase-like portion 40 (the leading end part 22) of the front portion of the base plate 12 is projected and inserted into an interior of the lower protruding portion 48 while the upper surface of the rear end of the rear portion 16 of the base plate 12 is held in contact with the lower surface of a radiator support 60 that is fixedly provided at a front portion of the vehicle so as to extend in the vehicle width direction, for supporting a radiator 54.

In a state in which the leg-sweep apparatus 10 is thus disposed, the first bend 26 which is the lower end of the first vertically extending portion 34 and which is the front end of the first horizontally extending portion 32 is located adjacent to a lower portion of the inner surface of the lower protruding portion 48 while the third bend 30 which is the lower end of the second vertically extending portion 38 and which is the front end of the second horizontally extending portion 36 is located adjacent to a middle portion of the inner surface of the lower protruding portion 48 in its height direction. Further, the load-input surfaces 42, 43 of the respective first and second vertically extending portions 34, 38 are respectively opposed to and located as close as possible to the lower portion and the middle portion of the inner surface of the lower protruding portion 48 in the height direction thereof.

Fixing bolts 61 are respectively inserted into the plurality of insertion holes 23 formed at the rear end of the rear portion 16 of the base plate 12 and screwed into the radiator support 60, whereby the rear portion 16 of the base plate 12 is fixed to the radiator support 60.

Thus, the leg-sweep apparatus 10 is disposed in the lower part of the front face of the vehicle such that the leg-sweep apparatus 10 is horizontally located inside of the lower protruding portion 48 of the bumper cover 50 so as to extend in the frontward and backward direction of the vehicle, with the staircase-like portion 40 of the front portion 14 of the base plate 12 projected from the front face of the vehicle and with the rear portion 16 fixed to the radiator support 60.

In the exemplary embodiment, when a leg portion 62 of the pedestrian comes into contact or collides with the bumper cover 50 of the front bumper 44 as indicated by a two-dot chain line in FIG. 3, the upper protruding portion 46 and the lower protruding portion 48 of the bumper cover 50 are respectively brought into contact with the vicinity of a knee 64 and the vicinity of a shank 66 of the leg portion 62 of the pedestrian. In this instance, since the rigidity of the impact-absorbing member 56 is made smaller than that of the leg-sweep apparatus 10, the impact-absorbing member 56 is deformed more easily in a larger amount than the leg-sweep apparatus 10. Accordingly, the bumper cover 50 is deformed such that lower protruding portion 48 projects frontward of the vehicle farther than the upper protruding portion 46, so that the counterforce with respect to the impact load generated in the leg-sweep apparatus 10 by the collision of the leg portion 62 against the bumper cover 50 acts on the vicinity of the shank 66 of the leg portion 62 of the pedestrian via the lower protruding portion 48 of the bumper cover 50. As a result, the vicinity of the shank 66 of the leg portion 62 of the pedestrian is swept or scooped up by the leg-sweep apparatus 10, thereby causing the pedestrian to fall down or to be thrown toward the bonnet 52 of the vehicle. Thus, it is possible to limit bending of the knee 64 of the pedestrian in an unnatural or undesirable direction, thereby minimizing occurrence of injuries to the knee 64 such as bone fractures and effectively assuring protection and safety of the pedestrian.

In the leg-sweep apparatus 10 according to the exemplary embodiment, in particular, the load-input surface 42 of the first vertically extending portion 34 and the load-input surface 43 of the second vertically extending portion 38 are located inside of the lower protruding portion 48 of the bumper cover 50 so as to be opposed to and located as close as possible to the inner surface of the lower protruding portion 48 in the frontward and backward direction, thereby effectively reducing a clearance between the inner surface of the lower protruding portion 48 of the bumper cover 50 and the front portion 14 of the base plate 12.

Each of the load-input surfaces 42, 43 is disposed so as to be right-angled to the horizontal plane that includes the input direction of the impact load, whereby the impact load is inputted, at right angles, to the load-input surfaces 42, 43 of the respective first and second vertically extending portions 34, 38. Therefore, in spite of the fact that the lower protruding portion 48 of the bumper cover 50 with which the leg portion 62 of the pedestrian is brought into collision has the convex curved surface configuration in vertical cross section, the front portion 14 of the base plate 12 is advantageously prevented from being deformed to be rolled up, for instance, by the impact load inputted to the staircase-like portion 40 of the base plate 12. The arrangement is effective to eliminate or restrain the delay of the rise of the impact load in the load characteristics.

Further, the first horizontally extending portion 32 and the second horizontally extending portion 36 are disposed inside of the lower protruding portion 48 of the bumper cover 50 so as to be located at the mutually different height levels, so that the portion of the base plate 12 that horizontally extends is divided into segments, so that moment arm is advantageously shortened, thereby effectively reducing rotation force generated in the base plate 12 upon inputting of the impact load. Therefore, it is possible to advantageously prevent the front portion 14 of the base plate 12 from being deformed to be rolled up, resulting in a prompt rise of the impact load in the load characteristics.

Moreover, because the first and second horizontally extending portions 32, 36 disposed inside of the lower protruding portion 48 of the bumper cover 50 so as to be located at the mutually different height positions exhibit sufficient rigidity with respect to the load inputted in the horizontal direction, the counterforce with respect to the impact load can be sufficiently and reliably exhibit in the leg-sweep apparatus 10 at the two different height positions upon inputting of the impact load accompanied by the collision of the leg portion 62 of the pedestrian.

Each of the load-input surfaces 42, 43 to which the impact load is inputted is configured to be right-angled to the horizontal plane as mentioned above, thereby advantageously increasing the contact area of the front portion 14 of the base plate 12 with the leg portion 62 of the pedestrian. Therefore, the impact load can be more sufficiently and reliably inputted to the leg-sweep apparatus 10. Consequently, the counterforce with respect to the impact load can be exhibited in the leg-sweep apparatus 10 with a larger magnitude.

Accordingly, in the thus constructed leg-sweep apparatus 10, the counterforce with respect to the impact load accompanied by the collision of the leg portion 62 of the pedestrian against the bumper cover 50 can instantaneously act on the vicinity of the shank 66 of the leg portion 62 with a sufficiently large magnitude even when the leg-sweep apparatus 10 is disposed inside of the lower protruding portion 48 of the bumper cover 50 whose vertical cross sectional shape is the convex curved configuration protruding frontward. Therefore, the leg portion 62 of the pedestrian which has collided with the bumper cover 50 can be promptly and reliably swept, so that the leg portion 62 of the pedestrian can be advantageously protected with high reliability.

Because the leg-sweep apparatus 10 according to the exemplary embodiment permits a prompt rise of the impact load in the load characteristics, the impact load reaches a target value quickly. Accordingly, the present leg-sweep apparatus 10 effectively assures a sufficient amount of the impact-absorbing stroke accompanied by buckling deformation of the horizontally extending portions after the impact load in the load characteristics has reached the target value.

In the present leg-sweep apparatus 10 constructed as described above, the second horizontally extending portion 36 is located at the front end portion of the staircase-like portion 40 of the base plate 12 while the third bend 30 as the front end of the second horizontally extending portion 36 is located at the middle portion of the staircase-like portion 40 in the height direction thereof. The thus constructed leg-sweep apparatus 10 is disposed inside of the lower protruding portion 48 of the bumper cover 50 with the third bend 30 located at the middle of the lower protruding portion 48 in its height direction. According to the arrangement, a point of initial contact of the leg-sweep apparatus 10 with the leg portion 62 of the pedestrian which is brought into collision with the bumper cover 50 is the third bend 30 of the staircase-like portion 40, so that the impact load can be inputted, with high reliability in the horizontal direction, to the second horizontally extending portion 36, whereby the front portion 14 of the base plate 12 is more effectively prevented from being deformed to be rolled up. In consequence, the leg portion 62 of the pedestrian can be protected with high efficiency and high reliability.

In the exemplary embodiment, the first and second reinforcing ribs 18, 20 for reinforcing the rigidity of the front portion 14 of the base plate 12 are formed integrally with the posterior surfaces (the back surfaces) of the load-input surfaces 42, 43 of the respective first and second vertically extending portions 34, 38 and the upper surfaces of the respective first and second horizontally extending portions 32, 36. According to the arrangement, the rigidity of the extending portions 32-38 can be advantageously increased, permitting the leg-sweep apparatus 10 to sufficiently exhibit the counterforce with respect to the impact load. As a result, the leg-sweep apparatus 10 assures further enhanced performance of protecting the leg portion 62 of the pedestrian. Moreover, by adjusting the number of the first and second reinforcing ribs 18, 20 and the locations of the same 18, 20, it is possible to suitably change the rigidity of the front portion 14 of the base plate 12, whereby the amount of buckling deformation of the front portion 14 of the base plate 12 accompanied by the input of the impact load can be easily tuned depending upon the magnitude of the impact load to be inputted.

Figure 4:
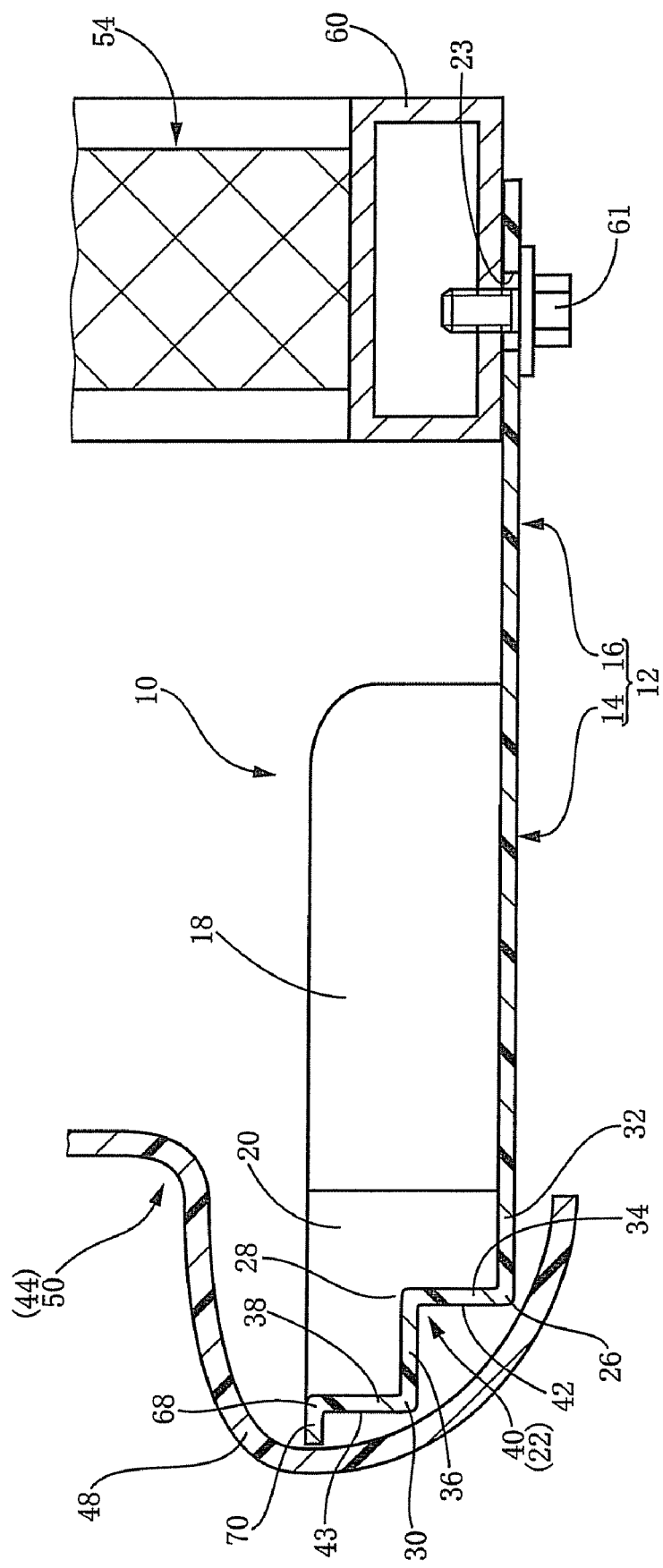
FIG. 4 is an explanatory view showing a state in which a pedestrian protection apparatus constructed according to a second embodiment of the invention is installed on a vehicle.

In the exemplary first embodiment, the forward end of the staircase-like portion 40 of the base plate 12 is constituted by the second vertically extending portion 38 that extends straightly in the vertical direction. The forward end of the staircase-like portion 40 may be constituted by a horizontally extending portion that extends horizontally, as shown in the leg-sweep apparatus of FIG. 4 constructed according to a second embodiment of the invention. In the second embodiment, the same reference numerals as used in the illustrated first embodiment of FIGS. 1-3 are used to identify the corresponding components, and a detailed explanation of which is dispensed with.

In the leg-sweep apparatus 10 according to the exemplary second embodiment, the leading end part 22 of the front portion 14 of the base plate 12 is in a bent form obtained by bending a flat plate extending straightly in the frontward and backward direction, at right angles in the frontward and backward direction at four locations which are spaced apart from each other by a prescribed distance in the frontward and backward direction, whereby the leading end part 22 includes, in addition to the first through third bends 26-30, a fourth bend 68 formed over the third bend 30. A portion of the leading end part 22 of the base plate 12 located on the front side of the fourth bend 68 (i.e., the forward end of the leading end part 22) is bent at right angles from the upper end of the second vertically extending portion 38 and is made as a third horizontally extending portion 70 that horizontally and straightly extends in the frontward and backward direction under installation of the leg-sweep apparatus 10 on the vehicle.

Thus, in the leading end part 22 of the front portion 14 of the base plate 12, each of the first, second and third horizontally extending portions 32, 36, 70 and each of the first and second vertically extending portions 34, 38 are alternately disposed in the frontward and backward direction so as to extend in a staircase-like form, whereby the entirety of the leading end part 22 is made as a staircase-like portion 40 constituted by the first, second and third horizontally extending portions 32, 36, 70 and the first and second vertically extending portions 34, 38.

The thus constructed leg-sweep apparatus 10 having the staircase-like portion 40 in which the third horizontally extending portion 70 is additionally provided is disposed at the lower part of the front face of the vehicle so as to be located inside of the lower protruding portion 48 of the bumper cover 50, such that the rear portion 16 is fixed to the radiator support 60 by the fixing bolts 61, with the staircase-like portion 40 (the leading end part 22) of the front portion 14 of the base plate 12 inserted into the interior of the lower protruding portion 48.

With the leg-sweep apparatus 10 installed on the vehicle as described above, in particular, the third horizontally extending portion 70 horizontally extends toward the inner surface of the lower protruding portion 48 so as to minimize a clearance formed between the front end face of the third horizontally extending portion 70 of the staircase-like portion 40 inserted into the interior of the lower protruding portion 48 and the inner surface of the lower protruding portion 48.

Accordingly, when the leg-sweep apparatus 10 constructed as described above is disposed inside of the lower protruding portion 48 of the bumper cover 50 having, in the vertical cross section, the convex curved surface configuration protruding forward, the clearance formed between the lower protruding portion 48 and the base plate 12 is advantageously made small, thereby effectively assuring a prompt rise of the impact load in the load characteristics, so that the leg portion of the pedestrian can be protected with higher reliability.

In addition, the vertically extending portion 34 extends straightly in the vertical direction of the vehicle, so that the impact load that is imposed upon frontal collision can be received by a plane of the vertically extending portion 34, in the horizontal direction. Accordingly, the vertically extending portion 34 can withstand a higher load, whereby a leg portion of the pedestrian can surely be swept.

It is noted that the respective numbers, the respective dimensions of extension, etc., of the horizontally extending portions 32, 36, 70 and the vertically extending portions 34, 38 that constitute the staircase-like portion 40 are not limited to those in the illustrated first and second embodiments, but may be suitably determined depending upon the desired pedestrian protection performance, more specifically, the magnitude of the counterforce to be exhibited in the pedestrian protection apparatus, the installation space for the pedestrian protection apparatus and the like.

In the illustrated first and second embodiments, in the leading end part 22 of the front portion 14 of the base plate 12, the portion thereof located on the back side of the first vertically extending portion 34 is made as the first horizontally extending portion 32, and the entirety of the leading end part 22 including the first horizontally extending portion 32 is formed as the staircase-like portion 40. The staircase-like portion 40 may be formed by the leading end part 22 that excludes the first horizontally extending portion 32. Namely, a portion of the leading end part 22 of the front portion 14 of the base plate 12 may be formed as the staircase-like portion 40. In this case, the staircase-like portion 40 in the illustrated first embodiment is constituted by the first and second vertically extending portions 34, 38 and the second horizontally extending portion 36 while the staircase-like portion 40 in the illustrated second embodiment is constituted by the first and second vertically extending portions 34, 38 and the second and third horizontally extending portions 36, 70.

The installation structure of the pedestrian protection apparatus (the leg-sweep apparatus 10) on the lower part of the front face of the vehicle is not particularly limited. Namely, the portion of the vehicle to which the rear portion of the plate member (the base plate 12) is fixed and the manner of fixing may be variously changed. Further, the pedestrian protection apparatus may be disposed at the lower part of the vehicle separately from and independently of the front bumper.

In the illustrated first and second embodiments, among the at least one horizontally extending portion 32, 36 and the plurality of vertically extending portions 34, 38, those which are located nearer to the forward end of the leading end part 22 are disposed at higher levels, whereby the staircase-like portion 40 is formed in a rising or ascending configuration in the frontward direction. On the contrary, among the at least one horizontally extending portion 32, 36 and the plurality of vertically extending portions 34, 38, those which are located nearer to the forward end of the leading end part 22 may be disposed at lower levels, whereby the staircase-like portion 40 is formed in a descending configuration in the frontward direction, further in a configuration ascending or descending in the backward direction from a bent state in which the leading end part 22 is bent backward.

Each of the anterior surfaces of the vertically extending portions in the staircase-like portion may be constituted by a flat plane orthogonal to the horizontal plane.

The configuration, the location, the number, etc., of the reinforcing ribs provided on the plate member are not particularly limited. The reinforcing ribs are not indispensable in the present invention, and may be eliminated.

Figure 5:
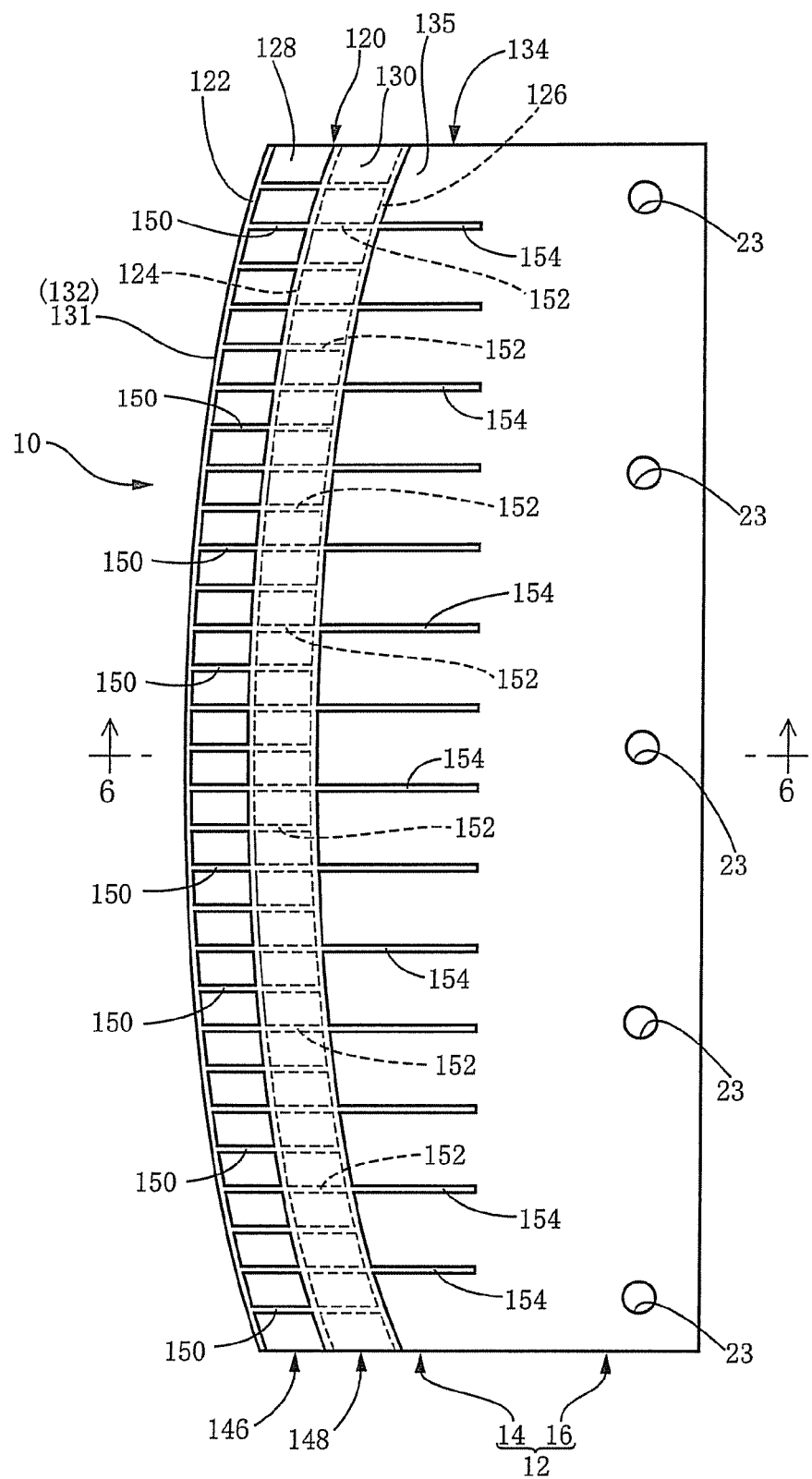
FIG. 5 is a top plan view showing a pedestrian protection apparatus constructed according to a third embodiment of the invention.

Referring next to the plan view of FIG. 5 and the vertical cross sectional view of FIG. 6, the leg-sweep apparatus as the pedestrian protection apparatus constructed according to a third embodiment of the invention will be explained. In the third embodiment, the same reference numerals as used in the illustrated first and second embodiments are used to identify the corresponding components, and a detailed explanation of which is not given.

As in the illustrated first and second embodiments, the base plate 12 as the plate portion is formed of the synthetic resin material such as polypropylene or ABS resin. Namely, the base plate 12 is constituted by a thin planar plate having a generally rectangular shape. In the base plate 12, the dimension as measured in a vertical direction of FIG. 5, i.e., the dimension as measured in the vehicle width direction or the leftward and rightward (lateral) direction of the vehicle under installation of the leg-sweep apparatus 10 on the vehicle, is made smaller than the vehicle width by a suitable amount, and the dimension as measured in a transverse direction of FIG. 5, i.e., the dimension as measured in the frontward and backward direction of the vehicle, is made sufficiently smaller the above-indicated direction as measured in the leftward and rightward direction.

As in the illustrated first and second embodiments, the base plate 12 includes the front portion 14 and the rear portion 16. At the rear end of the rear portion 16, the plurality of insertion holes 23 (here, five insertion holes 23) are formed through the thickness thereof into which suitable fixing bolts or the like are insertable, such that the insertion holes 23 are spaced apart from each other by a prescribed distance in the leftward and rightward direction.

In the leg-sweep apparatus 10 constructed according to the exemplary third embodiment, the front portion 14 of the base plate 12 has a special structure not found in conventional apparatus.

Namely, at a leading end part 120 of the front portion 14 of the base plate 12, there are provided three vertically extending portions 122, 124, 126 which extend straightly in the vertical direction over the entire width of the base plate 12 such that those vertically extending portions 122, 124, 126 are opposed to and spaced apart from each other by a constant distance in the frontward and backward direction. In addition, there are provided two horizontally extending portions 128, 130 which extend straightly in the horizontal direction over the entire width of the base plate 12 such that the horizontally extending portion 128 is interposed between the two vertically extending portions 122, 124 while the horizontally extending portion 130 is interposed between the two vertically extending portions 124, 126.

More specifically described, the three vertically extending portions 122, 124, 126 consist of: a front-side vertically extending portion 122 which is located at the forward end of the front portion 14 of the base plate 12; a first rear-side vertically extending portion 124 which is located immediately on the back side of the front-side vertically extending portion 122 so as to be opposed thereto; and a second rear-side vertically extending portion 126 which is located on the back side of the first rear-side vertically extending portion 124 so as to be opposed thereto at a substantially middle of the front portion 14 as seen in the frontward and backward direction. Each of the front-side, first rear-side and second rear-side vertically extending portions 122, 124, 126 has the same width as that of the base plate 12, and the same height (the dimension in the vertical direction) with each other. Each vertically extending portion 122, 124, 126 is constituted by a thin flat plate having a curved configuration that is deflected or warped so as to be convexed frontward in the thickness direction thereof.

According to the arrangement, the front end surface of the base plate 12, i.e., a load-input surface 131 to which the impact load generated upon collision of the leg portion of the pedestrian against the front face of the vehicle is inputted is constituted by an anterior surface 132 of the front-side vertically extending portion 122. The load-input surface 131 given by the anterior surface 132 is made as a curved surface obtained by deflecting or warping a vertical plane which is right-angled with respect to a horizontal plane that includes the input direction of the impact load generated accompanied by the collision of the leg portion of the pedestrian against the front face of the vehicle, such that the vertical plane is gradually curved backward from the middle portion thereof as seen in the leftward and rightward direction toward the opposite end portions thereof as seen in the same direction. Namely, the load-input surface 131 is constituted as a convex curved surface protruding frontward and formed by a path that is obtained by moving a vertical line so as to draw an arc.

In the meantime, the horizontally extending portions 128, 130 consist of a front-side horizontally extending portion 128 which is located between the lower ends of the respective front-side and first rear-side vertically extending portion 122, 124; and a rear-side horizontally extending portion 130 which is located between the upper ends of the respective first and second rear-side vertically extending portions 124, 126. Each of the front-side and rear-side horizontally extending portions 128, 130 is constituted by a thin flat plate which has a curved convex configuration protruding frontward in the width direction and corresponding to the anterior and posterior surfaces of the respective vertically extending portions 122, 124, 126 and which has a length (i.e., a dimension as measured in the leftward and rightward direction) that is the same as the width of the base plate 12 and a width (i.e., a dimension as measured in the frontward and backward direction) that is the same as a distance between any adjacent two of the vertically extending portions 122, 124, 126 which are opposed to each other.

The lower ends of the respective front-side vertically extending portion 122 and first rear-side vertically extending portions 124 are connected integrally to each other by the front-side horizontally extending portion 128 while the upper ends of the respective first and second rear-side vertically extending portions 124, 126 are connected integrally to each other by the rear-side horizontally extending portion 130. The second rear-side vertically extending portion 126 is connected, at its lower end, integrally to the rear portion 16 of the base plate 12 by a connecting portion 135 which is given by a proximal end part 134 of the front portion 14 of the base plate 12.

Thus, the front-side vertically extending portion 122, the first rear-side vertically extending portion 124 and the second rear-side vertically extending portion 126 are formed integrally on the front portion 14 of the base plate 12 so as to extend therefrom, such that adjacent two of the vertically extending portions 122, 124, 126 that are opposed to each other are connected integrally to each other by a corresponding one of the front-side and rear-side horizontally extending portions 128, 130 that are located at mutually different height levels in the frontward and backward direction.

In other words, in the leg-sweep apparatus 10 according to the exemplary third embodiment, the leading end part 120 of the front portion 14 of the base plate 12 is in a bent form obtained by bending a flat plate extending straightly in the frontward and backward direction, at right angles at its five locations which are spaced apart from each other by a prescribed distance in the frontward and rightward direction, so as to provide a first bend 136, a second bend 138, a third bend 140, a fourth bend 142 and a fifth bend 144 in order as seen from the front side.

In the leading end part 120 described above, a portion between the fifth bend 144 located at the rearmost of the leading end part 120 and the fourth bend 142 located on the front side of the fifth bend 144 is made as the second rear-side vertically extending portion 126 that extends straightly in the vertically upward direction from the front end of the connecting portion 135 as the proximal end part 134 of the front portion 14 of the base plate 12. A portion of the leading end part 120 between the fourth bend 142 and the third bend 140 which is located on the front side of the fourth bend 142 is made as the rear-side horizontally extending portion 130 that extends straightly in the horizontally forward direction from the upper end of the second rear-side vertically extending portion 126. A portion of the leading end part 120 between the third bend 140 and the second bend 138 which is located on the front side of the third bend 140 is made as the first rear-side vertically extending portion 124 that extends straightly in the vertically downward direction from the front end of the rear-side horizontally extending portion 130. A portion of the leading end part 120 between the second bend 138 and the first bend 136 which is located on the front side of the second bend 138 is made as the front-side horizontally extending portion 128 that extends straightly in the horizontally frontward direction from the lower end of the first rear-side vertically extending portion 124. An entire portion located on the front side of the first bend 136 is made as the front-side vertically extending portion 122 that extends straightly in the vertically upward direction from the front end of the front-side horizontally extending portion 128.

Thus, the leading end part 120 of the front portion 14 of the base plate 12 is constituted by the front-side vertically extending portion 122, the front-side horizontally extending portion 128, the first rear-side vertically extending portion 124, the rear-side horizontally extending portion 130 and the second rear-side vertically extending portion 126, so as to extend in the frontward and backward direction in a zigzag form in the upward and downward direction with a U-shaped configuration in vertical cross section.

In the arrangement described above, there is formed, at the front of the leading end part 120 of the base plate 12, a front-side U-shaped portion 146 that is constituted by the front-side horizontally extending portion 128, and the front-side vertically extending portion 122 and the first rear-side vertically extending portion 126 which are respectively formed integrally to the front end and the rear end of the front-side horizontally extending portion 128 such that the vertically extending portions 122, 126 are opposed to each other and extend straightly in the vertically upward direction. The front-side U-shaped portion 146 has a U-shaped configuration in vertical cross section that is open upward and extends over the entire width of the base plate 12. Further, there is formed, at the back of the leading end part 120, a rear-side U-shaped portion 148 that is constituted by the rear-side horizontally extending portion 130, and the first and second rear-side vertically extending portions 124, 126 which are respectively formed integrally to the front end and the rear end of the rear-side horizontally extending portion 130 such that the vertically extending portions 124, 126 are opposed to each other and extend straightly in the vertically downward direction. The rear-side U-shaped portion 148 has a U-shaped configuration in vertical cross section that is open downward and extends over the entire width of the base plate 12. That is, the front-side U-shaped portion 146 and the rear-side U-shaped portion 148 are formed integrally on the leading end part 120 of the front portion 14 of the base plate 12 so as to be located continuously in the frontward and backward direction.

Accordingly, in the present leg-sweep apparatus 10, the front-side U-shaped portion 146 and the rear-side U-shaped portion 148 provided on the leading end part 120 of the front portion 14 of the base plate 12 function as beads which reinforce the front portion 14 (the leading end part 120), thereby increasing the flexural or bending strength of the front portion 14. Thus, the rigidity with respect to the impact load to be inputted upon collision of the leg portion of the pedestrian against the front face of the vehicle can be sufficiently obtained, as described below.

Further, on the front portion 14 of the base plate 12, there are formed, each as a reinforcing portion, first through third reinforcing ribs 150, 152, 154 which are formed integrally to the upper surface of the front-side horizontally extending portion 128, the lower surface of the rear-side horizontally extending portion 130 and the upper surface of the connecting portion 135 which is given by the proximal end part 134.

Namely, each of the first reinforcing ribs 150 is a flat plate having the same height as the front-side vertically extending portion 122 and the first and second rear-side vertically extending portions 124, 126 and the thickness smaller than the thickness of those vertically extending portions 122, 124, 126. The first reinforcing ribs 150 are opposed to and spaced apart from each other in the leftward and rightward direction by a suitable distance so as to be parallel to each other. The thus located first reinforcing ribs 150 extend continuously and straightly in the frontward and backward direction so as to be integral with the posterior surface of the front-side vertically extending portion 122 and the anterior surface of the first rear-side vertically extending portion 124.

Each of the second reinforcing ribs 152 is a flat plate having a height, a thickness and a length (i.e., a dimension as measured in the frontward and backward direction) which are the same as those of the first reinforcing ribs 150. The number of the second reinforcing ribs 152 is the same as that of the first reinforcing ribs 150. The second reinforcing ribs 152 are located between the first-side and second-side vertically extending portions 124, 126 such that the second reinforcing ribs 152 are opposed to and spaced apart from each other in the leftward and rightward direction by the same distance as the distance between any adjacent two of the first reinforcing ribs 150, so as to be parallel to each other. The thus located second reinforcing ribs 152 extend continuously and straightly in the frontward and backward direction so as to be integral with the posterior surface of the first rear-side vertically extending portion 124 and the anterior surface of the second rear-side vertically extending portion 126. The location of each of the second reinforcing ribs 152 in the leftward and rightward direction corresponds to the location of each of the first reinforcing ribs 150 in the same direction.

While each of the third reinforcing ribs 154 has a height and a thickness which are the same as those of the first and second reinforcing ribs 150, 152, each third reinforcing rib 154 has a length (i.e., a dimension as measured in the frontward and backward direction) which is larger than that of the first and second reinforcing ribs 150, 152. The number of the third reinforcing ribs 154 is approximately half the number of the first and second reinforcing ribs 150, 152. The third reinforcing ribs 154 are located on the back side of the second rear-side vertically extending portion 126 such that the third reinforcing ribs 154 are opposed to and spaced apart from each other in the leftward and rightward direction by a distance twice the distance between any adjacent two of the first reinforcing ribs 150, so as to be parallel to each other. The thus located third reinforcing ribs 154 are integral with the posterior surface of the second rear-side vertically extending portion 126 and extend continuously and straightly in the frontward and backward direction from the posterior surface of the second rear-side vertically extending portion 26 to a boundary between the front portion 14 and the rear portion 16.

As explained above, the first and second reinforcing ribs 150, 152 are formed, at close intervals, integrally with the leading end part 120 of the front portion 14 of the base plate 12 on which are formed the front-side U-shaped portion 146 and the rear-side U-shaped portion 148, thereby sufficiently increasing the flexural or bending strength of the leading end part 120, further, the rigidity of the same 120 with respect to the impact load. Moreover, the third reinforcing ribs 154 are formed integrally with the proximal end portion 134 (the connecting portion 135) of the front portion 14, whereby the proximal end part 134 advantageously has increased flexural or bending strength, further, increased rigidity with respect to the impact load, as compared with a case in which the rear portion 16 of the base plate 12 has no reinforcing ribs 154.

Figure 7:
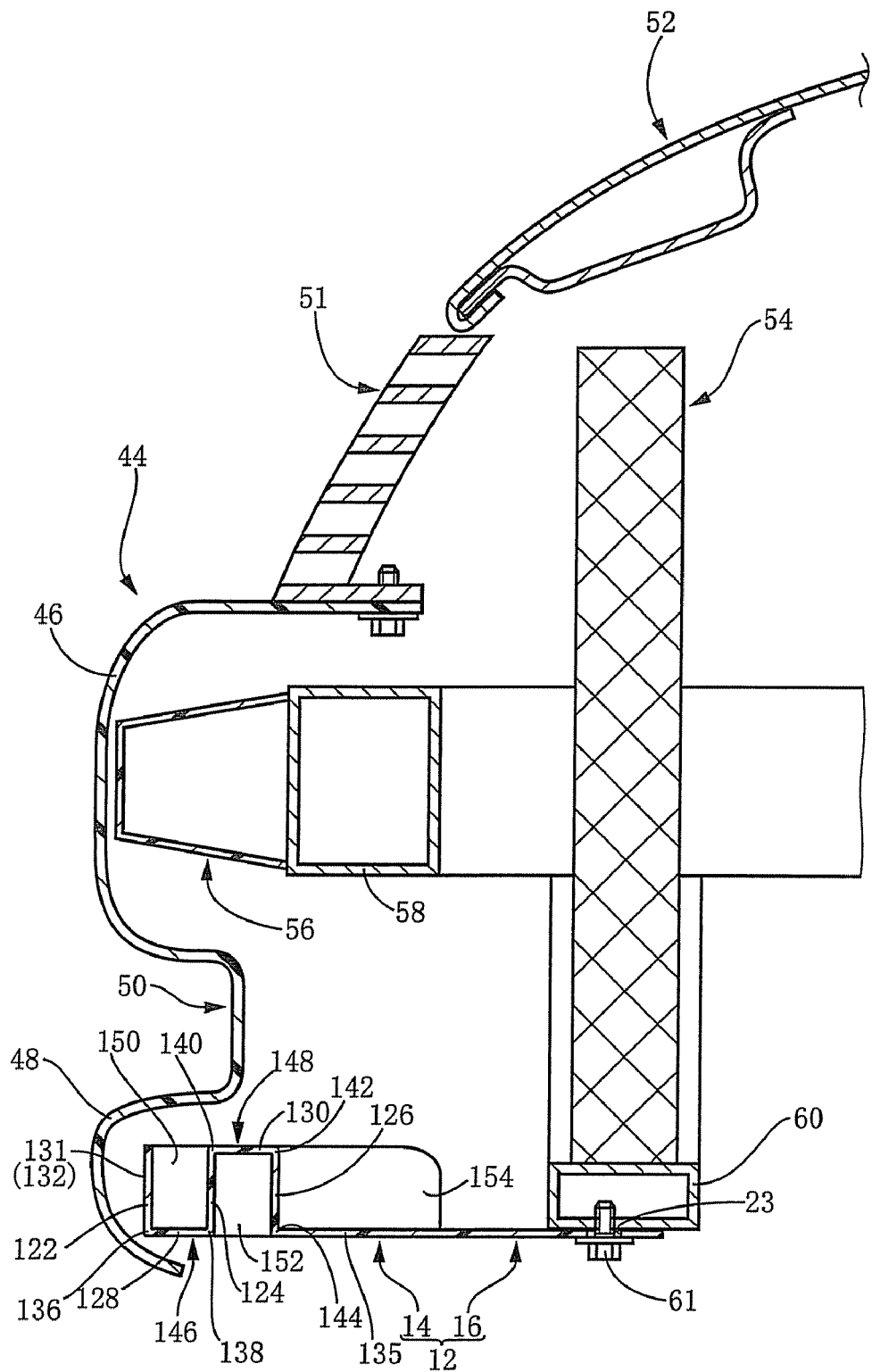
FIG. 7 is an explanatory view showing a state in which the pedestrian protection apparatus of FIG. 5 is installed on a vehicle.

As shown in FIG. 7, the leg-sweep apparatus 10 is installed inside of the front bumper 44 which has a structure similar to that explained above with respect to the illustrated first exemplary embodiment.

As in the illustrated first embodiment, the impact-absorbing member 56 whose rigidity is smaller than that of the leg-sweep apparatus 10 is fixed, inside of the upper protruding portion 46 of the bumper cover 50, to the bumper reinforcement 58 as the rigid member.

The leg-sweep apparatus 10 is disposed inside of the front bumper 44 as described below: The front-side and rear-side U-shaped portions 146, 148 formed at the leading end part 120 of the front portion 14 of the base plate 12 are projected from the front face of the vehicle, and the front of the front-side U-shaped portion 146 is inserted into the interior of the lower protruding portion 48 while the upper surface of the rear end of the rear portion 16 of the base plate 12 is held in contact with the lower surface of the radiator support 60 that is fixedly provided at the front portion of the vehicle so as to extend in the vehicle width direction, for supporting the radiator 54. The fixing bolts 61 are respectively inserted into the plurality of insertion holes 23 formed at the rear end of the rear portion 16 of the base plate 12 and screwed into the radiator support 60, whereby the rear portion 16 of the base plate 12 is fixed to the radiator support 60.

Thus, the leg-sweep apparatus 10 is disposed in the lower part of the front face of the vehicle so as to extend horizontally in the frontward and backward direction and is fixedly positioned such that the load-input surface 131 of the front-side vertically extending portion 122 in the front-side U-shaped portion 146 of the base plate 12 is opposed to the inner surface of the lower protruding portion 48 of the bumper cover 50 and such that the first bend 36 which is the lower end of the front-side vertically extending portion 122 and which is the front end of the front-side horizontally extending portion 128 is located adjacent to the inner surface of the lower protruding portion 48 of the bumper cover 50.

Figure 8:
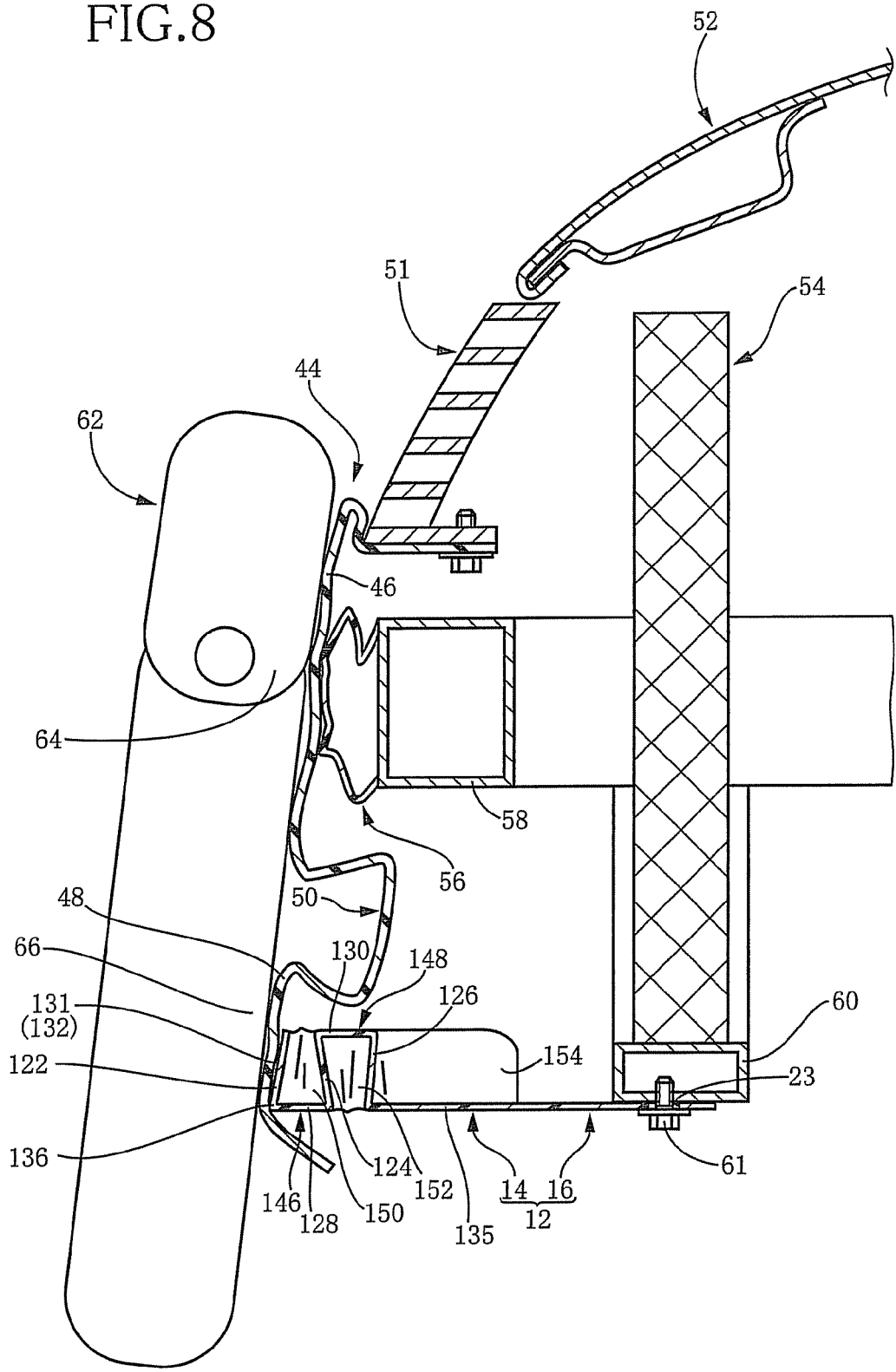
FIG. 8 is an explanatory view showing a deformation state of the pedestrian protection apparatus of FIG. 5 upon collision of a pedestrian with a front face of the vehicle.

As described above with respect to the illustrated first embodiment, in the exemplary third embodiment, when the leg portion 62 of the pedestrian comes into contact or collides with the bumper cover 50 of the front bumper 44 as shown in FIG. 8, the upper protruding portion 46 and the lower protruding portion 48 of the bumper cover 50 are respectively brought into contact with the vicinity of the knee 64 and the vicinity of the shank 66 of the leg portion 62 of the pedestrian. In this instance, since the rigidity of the impact-absorbing member 56 is made smaller than that of the leg-sweep apparatus 10, the impact-absorbing member 56 is deformed more easily in a larger amount than the leg-sweep apparatus 10. Accordingly, the bumper cover 50 is deformed such that lower protruding portion 48 projects frontward of the vehicle farther than the upper protruding portion 46, so that the counterforce with respect to the impact load generated in the leg-sweep apparatus 10 by the collision of the leg portion 62 against the bumper cover 50 acts on the vicinity of the shank 66 of the leg portion 62 of the pedestrian via the lower protruding portion 48 of the bumper cover 50. As a result, the vicinity of the shank 66 of the leg portion 62 of the pedestrian is swept or scooped up by the leg-sweep apparatus 10, thereby causing the pedestrian to fall down or to be thrown toward the bonnet 52 of the vehicle. Thus, it is possible to limit bending of the knee 64 of the pedestrian in an unnatural or undesirable direction, thereby minimizing occurrence of injuries to the knee 64 such as bone fractures and effectively assuring protection and safety of the pedestrian.

In particular, the leg-sweep apparatus 10 constructed as described above has, at the leading end part 120 of the front portion 14 of the base plate 12, the front-side U-shaped portion 146 and the rear-side U-shaped portion 148 each functioning as a bead for reinforcing the leading end part 120. In addition, the first through third reinforcing ribs 150-154 are formed integrally with the leading end part 120 and the proximal end part 134, whereby the rigidity of the front portion 14 as a whole with respect to the impact load is sufficiently obtained. Therefore, the front portion 14 of the base plate 12 is effectively prevented from being easily deformed or deflected due to the impact load inputted thereto.

In the leg-sweep apparatus 10 constructed as described above, the load-input surface 131 of the front-side vertically extending portion 122 which is located so as to be opposed to the inner surface of the lower protruding portion 48 of the bumper cover 50 is orthogonal to the horizontal plane that includes the input direction of the impact load, whereby the impact load is inputted perpendicularly to the load-input surface 131. Accordingly, the front portion 14 of the base plate 12 can be advantageously prevented from being easily deformed or deflected.

Further, the front-side and rear-side horizontally extending portions 128, 130 of the respective front-side and rear-side U-shaped portions 146, 148 are located at mutually different height levels. Accordingly, the portion of the base plate 12 that horizontally extends is divided into: a continuous portion between the proximal end portion 134 of the front portion 14 and the rear portion 16; the front-side horizontally extending portion 128; and the rear-side horizontally extending portion 130. Accordingly, the moment arm can be advantageously shortened, and the rotation force generated in the base plate 12 upon inputting of the impact load is effectively weakened, thereby assuring the effect of preventing easy deformation or deflection of the front portion 14 of the base plate 12.

Figure 6:
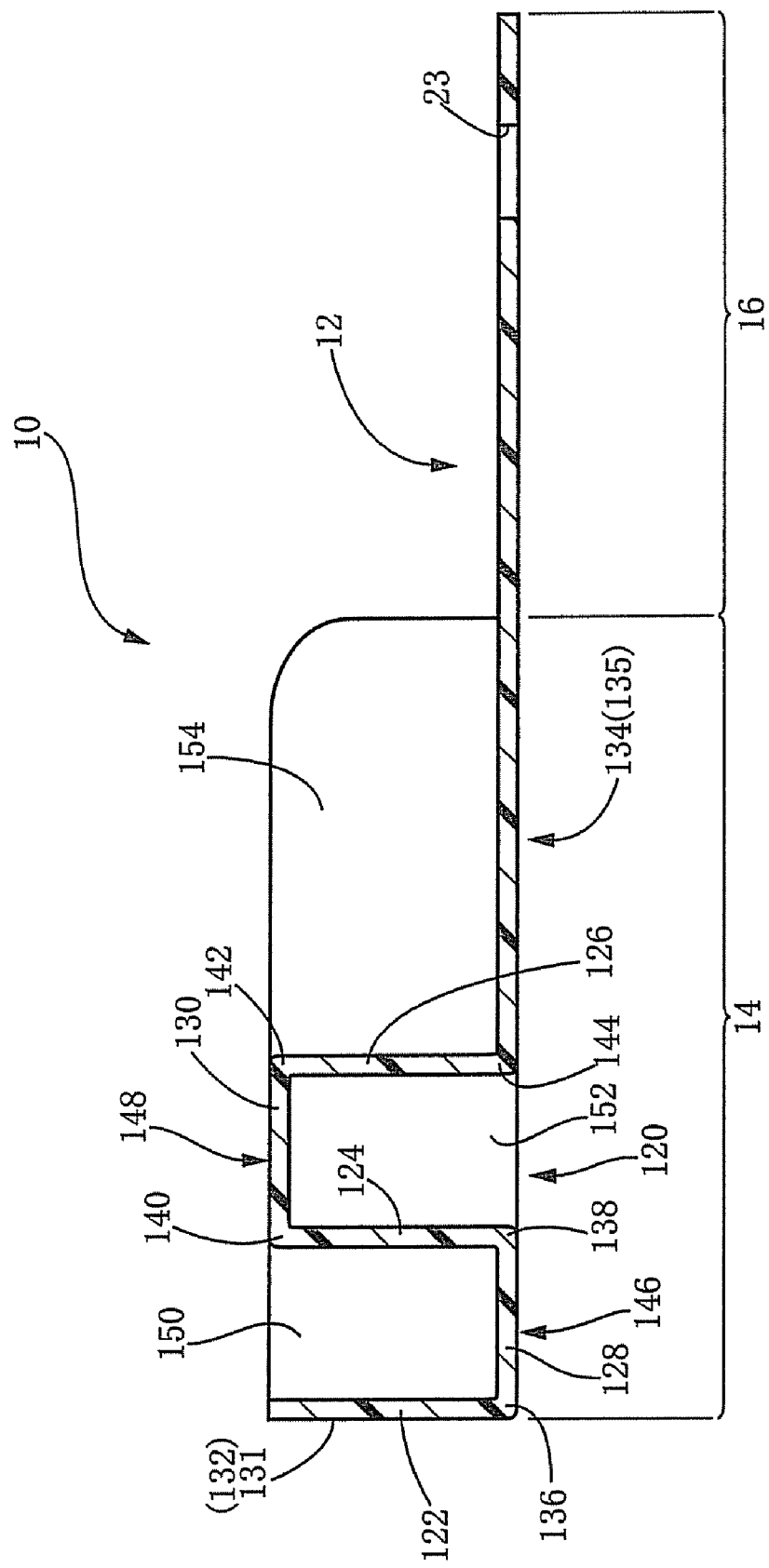
FIG. 6 is a cross sectional view taken along line 6-6 of FIG. 5.

In the leg-sweep apparatus 10 constructed as described above according to the third exemplary embodiment, the front-side U-shaped portion 146 and the rear-side U-shaped portion 148 are formed continuously, so that the leading end part 120 of the front portion 14 of the base plate 12 has, as a whole, a zigzag configuration shown in FIG. 6 extending in the frontward and backward direction. Accordingly, as shown in FIG. 7, due to the impact load inputted to the front-side vertically extending portion 122 of the front-side U-shaped portion 146, the front-side and rear-side horizontally extending portions 128, 130 of the respective front-side and rear-side U-shaped portions 146, 148 are displaced backward while the impact load is gradually transmitted from the front portion 14 toward the rear portion 16 of the base plate 12. In this instance, the first and second rear-side vertically extending portions 124, 126 of the respective front-side and rear-side U-shaped portion 146, 148 are deformed over a wide range in the width direction of the base plate 12, such that those vertically extending portions 124, 126 incline frontward or backward by a suitable angle with respect to the vertical direction. Therefore, the impact load is effectively transmitted in the width direction of the base plate 12. Consequently, the impact load is advantageously distributed in the front portion 14 of the base plate 12, whereby the front portion 14 of the base plate 12 is effectively prevented from easily deformed or deflected upon inputting of the impact load thereto.

As explained above, in the present embodiment, the easy deformation or deflection of the front portion 14 of the base plate 12 upon inputting of the impact load thereto can be prevented, thereby obviating a delay of rise of the impact load in the load characteristics due to deformation or deflection of the front portion 14 of the base plate 12.

Accordingly, the present leg-sweep apparatus 10 permits a prompt rise of the impact load in the load characteristics, whereby sufficient counterforce with respect to the impact load can be instantaneously and adequately exhibited. As a result, the leg portion 62 of the pedestrian which has collided with the front bumper 44 can be instantaneously and reliably swept, assuring a higher level of protection of the leg portion 62 of the pedestrian.

Since the present leg-sweep apparatus 10 permits a prompt rise of the impact load in the load characteristics, the impact load can reach a target value more quickly. Consequently, the present leg-sweep apparatus 10 effectively assures a sufficient amount of the impact-absorbing stroke accompanied by buckling deformation off the horizontally extending portions 128, 130, the connecting portion 135, etc., after the impact load in the load characteristics has reached the target value.

In the exemplary third embodiment, the first through third reinforcing ribs 150-154 are formed integrally with the front portion 14 of the base plate 12 for increasing the rigidity of the same 14. As compared with an arrangement in which the rigidity of the front portion 14 is increased by securing, to the base plate 12, members separate from the base plate 12, for instance, the present arrangement is effective to improve the manufacturing efficiency and lower the manufacturing cost of the base plate 12, and accordingly the leg-sweep apparatus 10 as a whole. Moreover, by adjusting the number, the location, etc., of each of the first through third reinforcing ribs 150-154, the rigidity of the front portion 14 of the base plate 12 can be suitably changed, thereby making it possible to easily tune, depending upon the magnitude of the impact load to be inputted, the amount of buckling deformation of the front portion 14 of the base plate 12 accompanied by the input of the impact load, and accordingly the amount of absorption of impact energy based on the buckling deformation of the front portion 14.

In the illustrated third embodiment, the leading end part 120 of the front portion 14 of the base plate 12 is provided with the two U-shaped portions 146, 148 which are continuously formed thereon. The leading end part 120 may have only one U-shaped portion 84, as shown in the leg-sweep apparatus of FIG. 9 according to a fourth embodiment of the invention. In the fourth embodiment, the same reference numerals as used in the embodiments illustrated above are used to identify the corresponding components, and a detailed explanation of which is omitted.

Figure 9:
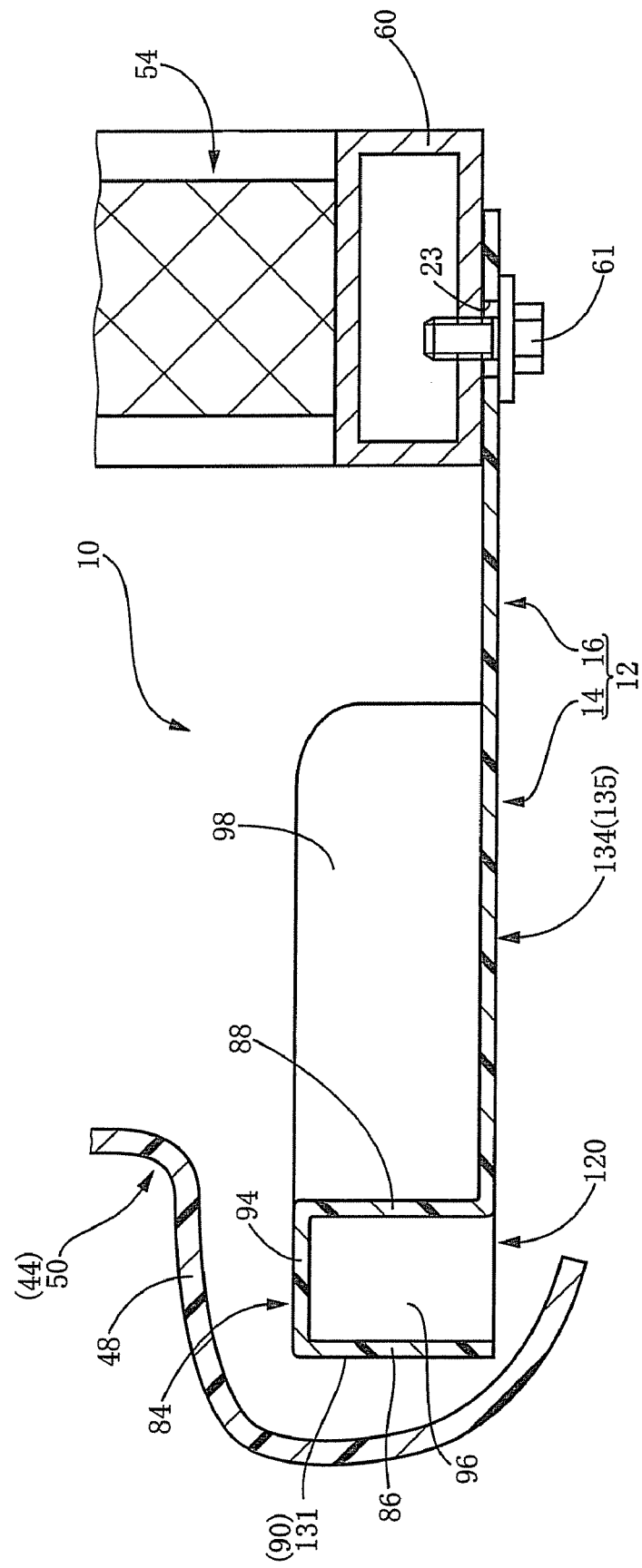
FIG. 9 is an explanatory view showing a state in which a pedestrian protection apparatus constructed according to a fourth embodiment of the invention is installed on a vehicle.

In the leg-sweep apparatus 10 according to the fourth embodiment shown in FIG. 9, a front-side vertically extending portion 86 and a rear-side vertically extending portion 88 which straightly extend in the vertical direction over the entire width of the base plate 12 are integrally formed on the leading end part 120 of the front portion 14 of the base plate 12, such that the vertically extending portions 86, 88 are opposed to and spaced apart from each other by a constant distance in the frontward and backward direction. Those front-side and rear-side vertically extending portions 86, 88 have a construction similar to that of the front-side and rear-side vertically extending portions (22), (24) in the illustrated third embodiment.

According to the arrangement described above, the anterior surface 90 of the front-side vertically extending portion 86 is made as a load-input surface 131 constituted by a curved surface obtained by deflecting or warping a vertical plane which is right-angled with respect to the horizontal plane that includes the direction of input of the impact load generated upon collision of the leg portion 62 of the pedestrian against the front bumper 44, such that the vertical plane is gradually curved backward from the middle portion thereof as seen in the leftward and rightward direction toward the opposite end portions thereof as seen in the same direction. Namely, the load-input surface 131 is constituted by a convex curved surface which protrudes forward and which is formed by a path that is obtained by moving a vertical line so as to draw an arc.

Further, between the upper ends of the respective front-side and rear-side vertically extending portions 86, 88, there is located a horizontally extending portion 94 which straightly extends in the horizontal direction over the entire width of the base plate 12 in the frontward and backward direction, whereby the upper ends of the respective front-side and rear-side vertically extending portions 86, 88 are connected integrally to each other by the horizontally extending portion 94. A connecting portion 135 constituted by a proximal end part 134 of the front portion 14 of the base plate 12 is connected integrally to the lower end of the posterior surface of the rear-side vertically extending portion 88, which posterior surface is opposite to the anterior surface thereof to which the horizontally extending portion 94 is connected.

In other words, in the exemplary fourth embodiment, the horizontally extending portion 94 is located at the leading end part 120 of the front portion 14 of the base plate 12, and the front-side vertically extending portion 86 is formed integrally with the front end of the horizontally extending portion 94 so as to straightly extend therefrom in the vertically downward direction. Further, the rear-side vertically extending portion 88 is formed integrally with rear end of the horizontally extending portion 94 such that the rear-side vertically extending portion 88 is opposed to and spaced apart from the front-side vertically extending portion 86 with a distance corresponding to the length of extension of the horizontally extending portion 94 interposed therebetween, so as to extend straightly in the vertically downward direction. The connecting portion 135 is connected, at its front end, integrally to the lower end of the posterior surface of the rear-side vertically extending portion 88.

Thus, at the leading end part 120 of the front portion 14 of the base plate 12, there is formed a U-shaped portion 84 constituted by the front-side vertically extending portion 86, the horizontally extending portion 94 and the rear-side vertically extending portion 88 and extending over the entire width of the base plate 12 with a U-shaped configuration that is open downward in vertical cross section.

In the thus constructed leg-sweep apparatus 10, the U-shaped portion 84 functions as a bead for reinforcing the leading end part 120 of the front portion 14 of the base plate 12, thereby sufficiently assuring the flexural or bending strength of the leading end part 120 and accordingly the rigidity of the same 120 with respect to the impact load.

In addition, the horizontally extending portion 94 and the connecting portion 135 are located at mutually different height levels, so that the moment arm can be advantageously shortened, and the rotation force generated in the plate member upon inputting of the impact load is effectively weakened, thereby assuring the effect of preventing the leading end part of the plate member from being deformed to be rolled up.

On the lower surface of the horizontally extending portion 94 which partially constitutes the U-shaped portion 84, there are provided a plurality of front-side reinforcing ribs 96 that are similar in construction to the first and second reinforcing ribs (150), (152) described in the illustrated third embodiment. The reinforcing ribs 96 are thin flat plates and are spaced apart from each other by a suitable distance in the leftward and rightward direction, so as to be integral with the posterior surface of the front-side vertically extending portion 86 and the anterior surface of the rear-side vertically extending portion 88. Moreover, on the upper surface of the connecting portion 135 constituted by the proximal end part 134 of the front portion 14 of the base plate 12, there are provided a plurality of rear-side reinforcing ribs 98 that are similar in construction to the third reinforcing ribs (154) described in the illustrated third embodiment. The rear-side reinforcing ribs 98 are thin flat plates and are spaced apart from each other by a suitable distance in the leftward and rightward direction, so as to be integral with the posterior surface of the rear-side vertically extending portion 88. According to the arrangement, the rigidity of the front portion 14 of the base plate 12 with respect to the impact load is more efficiently enhanced.

As in the illustrated third embodiment, the thus constructed leg-sweep apparatus 10 is disposed at the lower part of the vehicle with the front of the U-shaped portion 84 inserted and projected into the lower protruding portion 48 of the bumper cover 50 of the front bumper 44.

Accordingly, as the present leg-sweep apparatus 10 assures sufficient rigidity with respect to the impact load, so that the front portion 14 of the base plate 12 is effectively prevented from being easily deflected upon collision of the leg portion 62 of the pedestrian against the front bumper 44.

Further, when the impact load is inputted, the horizontally extending portion 94 of the U-shaped portion 84 is displaced backyard while the front-side and rear-side vertically extending portions 86, 88 are deformed over a wide range in the width direction of the base plate 12 so as to be inclined frontward or backward by a suitable angle with respect to the vertical direction. Accordingly, the impact load is effectively transmitted in both of the length direction and the width direction of the base plate and advantageously distributed in the front portion 14 of the base plate 12, preventing easy deflection of the front portion 14 of the base plate 12 due to the impact load inputted thereto.

Therefore, the leg-sweep apparatus 10 constructed as described above permits a prompt rise of the impact load in the load characteristics, thereby exhibiting sufficient counterforce with respect to the impact load at earlier timing. Consequently, the leg portion 62 of the pedestrian collided with the front bumper 44 can be promptly and reliably swept, so that the performance of protecting the leg portion of the pedestrian can be effectively enhanced.

In the leg-sweep apparatus 10 constructed as described above, only one U-shaped portion 84 is formed at the front portion 14 of the base plate 12, simplifying the structure of the base plate 12, and accordingly the structure of the leg-sweep apparatus 10 as a whole.

Figure 10:
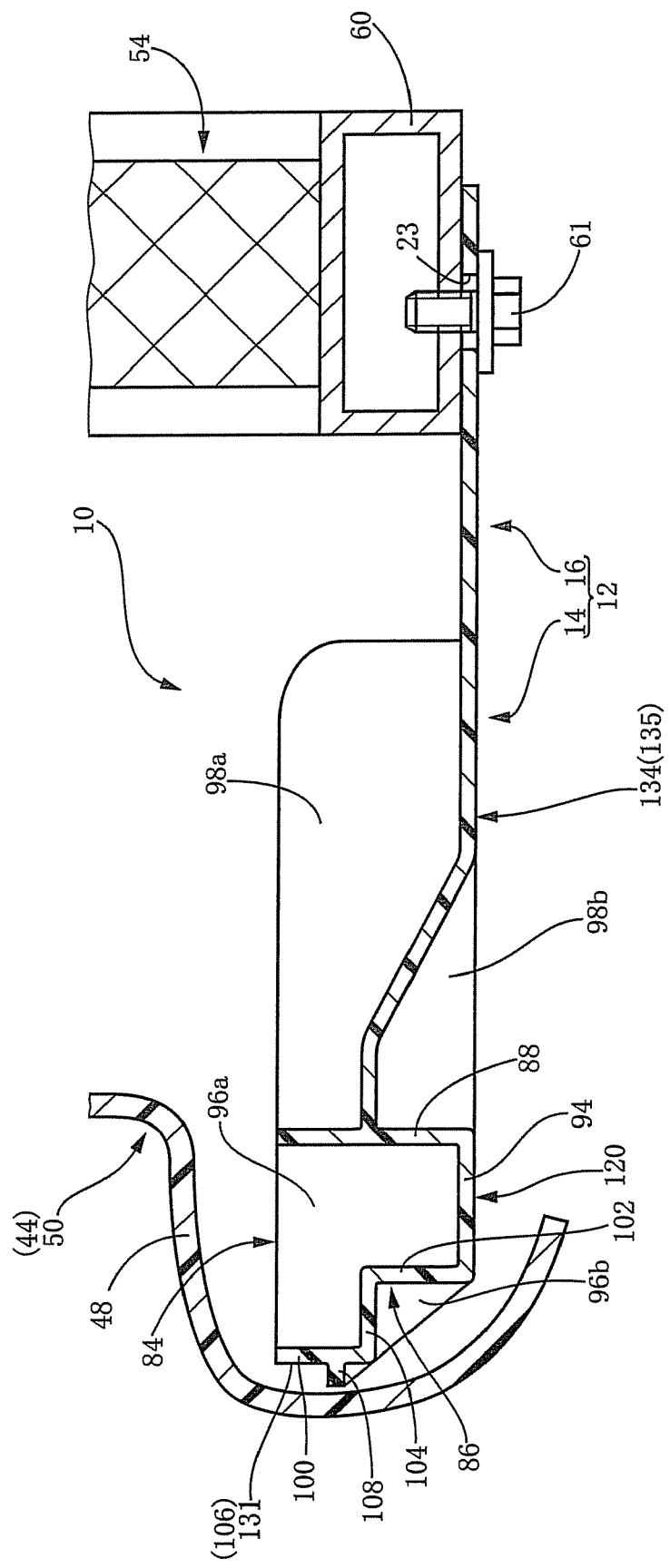
FIG. 10 is an explanatory view showing a state in which a pedestrian protection apparatus constructed according to a fifth embodiment of the invention is installed on a vehicle.

Referring next to FIG. 10, there will be explained a modified structure of the leg-sweep apparatus according to a fifth embodiment of the invention. In the exemplary fifth embodiment, while only one U-shaped portion 84 is formed at the leading end part 120 of the front portion 14 of the base plate 12 as in the illustrated fourth embodiment, the front-side vertically extending portion 86 of the U-shaped portion 84 has a special structure. Further, in the exemplary fifth embodiment shown in FIG. 10, the U-shaped portion 84 has a U-shaped configuration that is open upward. In the fifth embodiment, the same reference numerals as used in the illustrated embodiments are used to identify the corresponding components, and a detailed explanation of which is dispensed with.

In the leg-sweep apparatus 10 shown in FIG. 10, the front-side vertically extending portion 86 is bent at right angles at two locations in its height direction, so as to extend frontward in a staircase-like form.

In other words, front-side vertically extending portion 86 is divided into an upper front-side vertically extending portion 100 and a lower front-side vertically extending portion 102 which have mutually the same height dimension. The upper front-side vertically extending portion 100 and the lower front-side vertically extending portion 102 are positioned at mutually different height levels such that the former 100 is located frontward of the latter 102. These upper and lower front-side vertically extending portions 100, 102 are connected integrally to each other by an intermediate horizontally extending portion 104 that extends horizontally in the frontward and backward direction between the lower end of the upper front-side vertically extending portion 100 and the upper end of the lower front-side vertically extending portion 102.

According to the arrangement, the front of the U-shaped portion 84 provided at the leading end part 120 of the front portion 14 of the base plate 12 is constituted as a staircase-like portion, and an anterior surface 106 of the upper front-side vertically extending portion 100 of the staircase-like portion is made as the load-input surface 131 that straightly extends in the vertical direction. A horizontal projection 108 projecting in the horizontal direction by a prescribed amount is formed integrally with the load-input surface 131. The horizontal projection 108 is a rib formed of a thin, flat plate having the same thickness as that of the upper and lower front-side vertically extending portions 100, 102.

In the present leg-sweep apparatus 10 constructed as described above, the entirety of the front portion 14 of the base plate 12 except for the leading end part 120 on which is formed the U-shaped portion 84 is made as the proximal end part 134. The proximal end part 134 is made as the connecting portion 135 which connects the rear-side vertically extending portion 88 of the U-shaped portion 84 and the rear portion 16 of the base plate 12 integrally to each other. The connecting portion 135 consists of: a rear part which extends horizontally and frontward from the rear portion 16 of the base plate; an intermediate part which extends frontward and obliquely upward from the front end of the rear part; and a front part which extends horizontally and frontward from the front of the intermediate part and which is connected integrally to a middle portion of the posterior surface of the rear-side vertically extending portion 88 of the U-shaped portion 84 in the height direction thereof.

On the thus constructed front portion 14 of the base plate 12, there are formed a plurality of front-side reinforcing ribs 96 and a plurality of rear-side reinforcing ribs 98 each of which is a thin flat plate, as in the illustrated fourth embodiment. Here, the front-side reinforcing ribs 96 consist of: a plurality of upper front-side reinforcing ribs 96a which are formed on the upper surface of the horizontally extending portion 94 of the U-shaped portion 84 and which are integral with the posterior surfaces of the respective upper and lower front-side vertically extending portions 100, 102, the upper surface of the intermediate horizontally extending portion 104 and the anterior surface of the rear-side vertically extending portion 88; and a plurality of lower front-side reinforcing ribs 96b which are formed on the lower surface of the intermediate horizontally extending portion 104 of the U-shaped portion 84 and the lower surface of the horizontal projection 108 and which are integral with the anterior surface of the lower front-side vertically extending portion 102. Each of the lower front-side reinforcing ribs 96b has a triangular shape. The rear-side reinforcing ribs 98 consist of: a plurality of upper rear-side reinforcing ribs 98a which are formed on the upper surface of the connecting portion 135 and which are integral with the upper part of the posterior surface of the rear-side vertically extending portion 88; and a plurality of lower rear-side reinforcing ribs 98b which are formed on the lower surfaces of the intermediate and front parts of the connecting portion 135 and which are integral with the lower part of the posterior surface of the rear-side vertically extending portion 88.

The leg-sweep apparatus 10 constructed as described above is disposed inside of the bumper cover 50 such that the upper front-side vertically extending portion 100, the lower front-side vertically extending portion and the intermediate horizontally extending portion 104 which cooperate with each other to form the staircase-like portion in the front of the U-shaped portion 84 are inserted into the interior of the lower protruding portion 48 of the bumper cover 50 of the front bumper 44. In a state in which the leg-sweep apparatus 10 is disposed as described above, the load-input surface 131 of the upper front-side vertically extending portion 100 is located so as to be opposed to the inner surface of the lower protruding portion 48 having the convex curved surface protruding forward, via a slight clearance therebetween with the horizontal projection 108 interposed between the inner surface of the lower protruding portion 48 of the bumper cover 50 and the load-input surface 131. Further, the upper and lower front-side vertically extending portions 100, 102 have the mutually same height dimension, whereby the intermediate horizontally extending portion 104 of the staircase-like portion which is inserted into the interior of the lower protruding portion 48 of the bumper cover 50 is located at a middle of the lower protruding portion 48 in its height direction. Thus, the leg-sweep apparatus 10 is fixedly positioned in a manner similar to that described in the illustrated embodiments.

As mentioned above, in the leg-sweep apparatus 10 according to the exemplary fifth embodiment, the U-shaped portion 84 and the reinforcing ribs 96, 98 are provided on the front portion 14 of the base plate 12, whereby the front portion 14 has sufficient rigidity with respect to the impact load while, at the same time, the impact load can be effectively transmitted in the length direction and the width direction of the front portion 14 of the base plate 12. Therefore, the front portion 14 of the base plate 12 can be effectively prevented from being easily deformed or deflected by the impact load upon collision of the leg portion 62 of the pedestrian collided with the bumper cover 50.

In the state in which the leg-sweep apparatus 10 is disposed inside of the bumper cover 50 of the front bumper 44 as described above, the intermediate horizontally extending portion 104 of the staircase-like portion which is inserted into the interior of the lower protruding portion 48 of the bumper cover 50 is located at a middle of the lower protruding portion 48 in its height direction, so that a point of initial contact of the leg-sweep apparatus 10 with the leg portion 62 of the pedestrian is the front end of the intermediate horizontally extending portion 104 of the staircase-like portion provided on the front portion 14 of the base plate 12. Accordingly, the impact load is inputted, with high reliability, in the horizontal direction to the front portion 14 of the base plate 12, effectively avoiding easy deflection of the front portion 14.

Therefore, the present leg-sweep apparatus 10 advantageously avoids a delay of the rise of the impact load in the load characteristics due to the deflection of the front portion 14 of the base plate 12 by the impact load inputted thereto.

Further, in the state in which the leg-sweep apparatus 10 is disposed inside of the bumper cover 50 of the front bumper 44 as described above, the load-input surface 131 of the upper front-side vertically extending portion 100 is opposed to the inner surface of the lower protruding portion 48 of the bumper cover 50 with a slight clearance therebetween. In addition, the horizontal projection 108 formed integrally on the load-input surface 131 is located between the load-input surface 131 and the inner surface of the lower protruding portion 48 of the bumper cover 50. According to the arrangement, even where the inner surface of the lower protruding portion 48 of the bumper cover 50 has the convex curved surface configuration that protrudes frontward, it is possible to effectively eliminate or restrain the delay of the rise of the impact load in the load characteristics due to the existence of the clearance between the inner surface of the lower protruding portion 48 and the front portion 14 of the base plate 12.

In the present leg-sweep apparatus 10, therefore, sufficient counterforce with respect to the impact load can be exhibited at earlier timing, so that the leg portion 62 of the pedestrian collided with the front bumper 44 can be quickly and reliably swept, assuring more enhanced performance of protecting the leg portion of the pedestrian.

As the horizontally extending portions 128, 130 and the rear-side U-shaped portions 146, 148 are located at mutually different height levels, the moment arm can be advantageously shortened, and the rotation force generated in the plate member upon inputting of the impact load is effectively weakened, thereby assuring the effect of preventing the leading end part of the plate member from being deformed to be rolled up.

The leg-sweep apparatus 10 according to the illustrated third through fifth embodiments may be otherwise embodied.

For instance, the number of the rear-side vertically extending portions 124, 126, 88 provided at the front portion 14 of the base plate 12 as the plate member on the back side of the front-side vertically extending portion 122, 86 is not limited to those in the illustrated third through fifth embodiments, but may be three or more.

The thickness and the height of the front-side vertically extending portion 122, 86 may be made different from those of the rear-side vertically extending portion 124, 126, 88.

Further, the number of the horizontally extending portion each connecting adjacent two of the rear-side vertically extending portions 124, 126, 88 that are opposed to each other may be suitably increased or decreased depending upon the number of the rear-side vertically extending portions.

The number of the rear-side vertically extending portions 124, 126, 88 and the number of the horizontally extending portions 128, 130, 94 may be suitably determined depending upon the degree of rigidity of the front portion 14 of the base plate 12 with respect to the impact load, the installation space for the pedestrian protection apparatus, etc.

Further, a connection point of the connecting portion to the rear-side vertically extending portion may be suitably determined among any point of the posterior surface of the rear-side vertically extending portion which is located at a different height level from a connection point of the anterior surface of the rear-side vertically extending portion to the horizontally extending portion, depending upon the installation space for the pedestrian protection apparatus, etc.

Where the plurality of horizontally extending portions are respectively located between the front-side vertically extending portion and the rear-side vertically extending portion which is opposed thereto and between adjacent two of the vertically extending portions which are opposed to each other, for connecting the mutually opposing vertically extending portions to each other, namely, where there are provided a plurality of U-shaped portions, connection points of each horizontally extending portion with respect to each vertically extending portion are not limited to the mutually corresponding ends or edges of each vertically extending portion as in the illustrated embodiments, but may be mutually corresponding end portions of each vertically extending portion nearer to the middle than the end or edges, as long as adjacent two of the plurality of horizontally extending portions are located at mutually different height levels.

Where only one U-shaped portion is provided, namely, where the front-side and rear-side vertically extending portions are respectively formed integrally with the front end and rear end of one horizontally extending portion, the front-side and rear-side vertically extending portions may not be formed integrally with the respective front and rear ends or edges of the horizontally extending portion as in the illustrated embodiments, but at least one of the front-side and rear-side vertically extending portions may be provided at an end portion of the horizontally extending portion nearer to the middle than the front end or the rear end thereof, for instance. Further, where the front-side and rear-side vertically extending portions are respectively provided at the front and rear ends of the horizontally extending portion, at least one of the front-side and rear-side vertically extending portions may be made integral, at an end portion thereof nearer to the middle than the vertically opposite ends thereof, with the corresponding one of the front and rear ends of the horizontally extending portion.

In other words, where one or plurality of U-shaped portion(s) is/are formed on the leading end part of the front portion of the plate member (the base plate), each U-shaped portion may not be constituted by combining the entirety of each vertically extending portion and the entirety of each horizontally extending portion, but may be constituted by combining a part of each vertically extending portion and a part of each horizontally extending portion.

The installation structure of the pedestrian protection apparatus on the lower part of the front face of the vehicle is not particularly limited to that in the illustrated embodiments. Namely, the portion of the vehicle to which the rear portion of the plate member is fixed and the manner of fixing may be variously changed. Further, the pedestrian protection apparatus may be disposed at the lower part of the vehicle separately from and independently of the front bumper.

The anterior surface of the front-side vertically extending portion functioning as the load-input surface 131 may be constituted by a flat plane that is orthogonal to the horizontal plane.

Where the front-side vertically extending portion is bent at substantially right angles at a plurality of locations in the middle portion thereof in the height direction so as to have the staircase-like form extending in the vertical direction, the front-side vertically extending portion may be bent at right angles at three or more locations in its height direction. The bending angle may be somewhat larger or smaller than 90°.

The staircase-like portion formed by bending the front-side vertically extending portion as described above may be in a descending configuration in the forward direction, or in a configuration ascending or descending configuration in the backward direction from a bent state in which the front-side vertically extending portion is bent backward, in addition to the illustrated ascending configuration in the forward direction.

In the illustrated third through fifth embodiments, the reinforcing ribs 150, 152, 154, 96, 98 are formed as reinforcing portions on the front portion 14 of the base plate 12. The structure of the reinforcing portions is not particularly limited, provided that the reinforcing portions are capable of preventing easy deformation of the front portion 14 of the base plate 12 due to the impact load inputted thereto accompanied by the collision of the leg portion of the pedestrian against the front face of the vehicle. Where the reinforcing portions are constituted by the illustrated reinforcing ribs 150, 152, 154, 96, 98, the configuration, the location, the number, etc., of the reinforcing ribs may be suitably changed. Further, the reinforcing portions are not indispensable in the present invention, and may be eliminated.

In the illustrated first through fifth embodiments, the counterforce with respect to the impact load generated in the leg-sweep apparatus 10 by the collision of the leg portion 62 of the pedestrian against the bumper cover 50 is arranged to act on the vicinity of the shank 66 of the leg portion 62 of the pedestrian via the lower protruding portion 48 of the bumper cover 50. The portion of the leg portion 62 of the pedestrian on which the counterforce with respect to the impact load acts may be suitably changed depending upon the installation position of the leg-sweep apparatus 10.

It is needless to mention that the principle of the invention is applicable to any pedestrian protection apparatus installed in various forms on the front face of vehicles other than the automotive vehicles.

It is to be understood that the present invention may be embodied with various other changes and modifications which may occur to those skilled in the art, without departing from the spirit and scope of the invention defined in the following claims.

EXAMPLES

To further clarify the present invention, there will be explained examples of the invention. It is to be understood that the invention is not limited to the details of the examples.

Initially, there was prepared, by carrying out injection molding using polypropylene, a leg-sweep apparatus (10) shown in FIG. 9 of the present invention. In the leg-sweep apparatus, a front portion (14) of a flat base plate (12) is provided with a U-shaped portion (84) consisting of a front-side vertically extending portion (86), a rear-side vertically extending portion (88) and a horizontally extending portion (94). Further, a plurality of reinforcing ribs (96, 98) are formed integrally on the front portion (14), and an anterior surface of the front-side vertically extending portion (86) is made as a load-input surface (131). The thus prepared leg-sweep apparatus is made as the invention example. In the leg-sweep apparatus of the invention example, the maximum length of the base plate in the frontward and backward direction is 300 mm and the width of the base plate is 1200 mm. The height of the front-side and rear-side vertically extending portions is 25 mm, and the length of the horizontally extending portion is 15 mm. The thickness of the base plate and each extending portion is 3 mm. Each reinforcing rib has a height of 25 mm and a thickness of 1.5-3 mm.

For comparison, apart from the leg-sweep apparatus of the invention example, there is prepared, by carrying out injection molding using polypropylene, a leg-sweep apparatus having a known structure. In the leg-sweep apparatus, a plurality of first ribs are formed integrally on a front portion of a flat base plate such that the first ribs extend in the length direction of the base plate and such that the first ribs are opposed to and spaced apart from each other in the width of the base plate by a suitable distance. Further, a second rib extending in the width direction is formed integrally on the front portion so as to intersect the plurality of first ribs. In the thus formed leg-sweep apparatus, the forward end face of the base plate is made as a load-input surface. This leg-sweep apparatus is made as a comparative example. The maximum length of the base plate as measured in the frontward and backward direction and the width of the base plate are made equal to those in the leg-sweep apparatus of the invention example. The height and the thickness of each of the first ribs and the second rib are made equal to those of the reinforcing ribs in the leg-sweep apparatus of the invention example.

Figure 11:
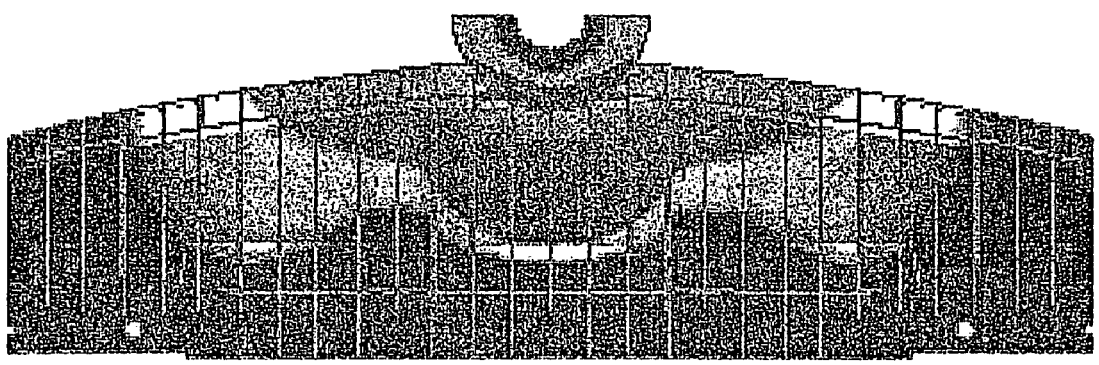
FIG. 11 is an explanatory view showing simulation results of the amount of partial deformation of the present pedestrian protection apparatus due to the impact load obtained by conducting a pedestrian collision test on the present pedestrian protection apparatus.
Figure 12:
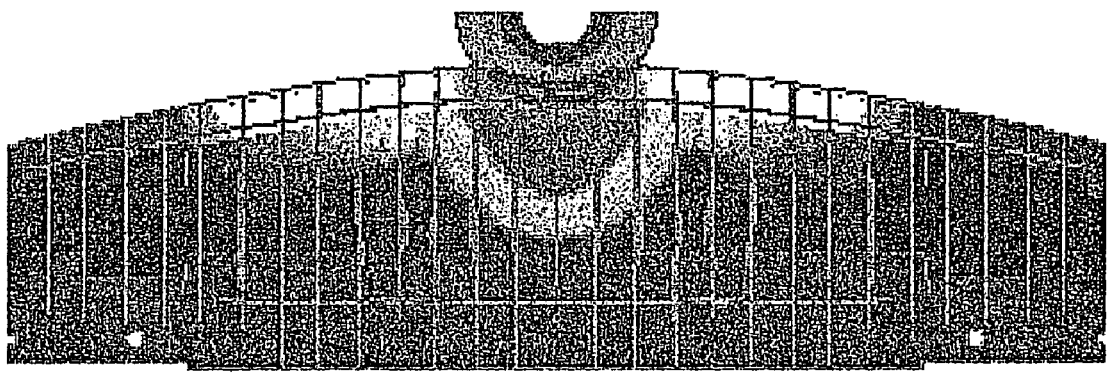
FIG. 12 is an explanatory view showing simulation results of the amount of partial deformation of a conventional pedestrian protection apparatus due to the impact load obtained by conducting a pedestrian collision test on the conventional pedestrian protection apparatus.

The thus prepared leg-sweep apparatus of the invention example and the leg-sweep apparatus of the comparative example were installed on a fixedly positioned base. Thereafter, an impactor having a semi-cylindrical shape and a weight of 21.3 kg was brought into collision with each of the load-input surfaces of the two leg-sweep apparatus according to the invention example and the comparative example, at a rate of 5.3 m/s. Thus, there were conducted pedestrian collision tests on the supposition of a collision of a pedestrian with each leg-sweep apparatus, whereby there were examined, for each apparatus, the portion of the apparatus deformed by the impact load inputted upon collision of the pedestrian and the amount of deformation of the portion, according to CAE analysis. The simulation results by the CAE analysis of the leg-sweep apparatus of the invention example and the comparative example are shown in FIG. 11 and FIG. 12, respectively. In FIGS. 11 and 12, the difference in the deformation amount in local portions of each apparatus is indicated by shading.

As shown in FIGS. 11 and 12, it is observed that the portion deformed by the impact load inputted upon collision of the pedestrian is distributed more widely at the front portion of the base plate in the leg-sweep apparatus of the invention example than in the leg-sweep apparatus of the comparative example. This clearly indicates that the leg-sweep apparatus having the structure according to the present invention permits the impact load to be distributed in a wide range at the front portion of the base plate, thereby effectively preventing deflection of the front portion of the base plate due to the impact load inputted thereto.

What is claimed is:

1. A pedestrian protection apparatus for a vehicle, comprising a plate member which is disposed at a lower part of a front face of the vehicle so as to extend in a frontward and backward direction of the vehicle with a predetermined width, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, wherein the plate member includes: a horizontally extending portion which is located at the leading end part of the front portion of the plate member so as to horizontally extend over an entire width of the plate member; a front-side vertically extending portion which is formed integrally with a front end of the horizontally extending portion so as to extend in a vertical direction, said front-side vertically extending portion being continuous and free of any discontinuities in its surface; a rear-side vertically extending portion which is formed integrally with a rear end of the horizontally extending portion so as to extend in the vertical direction such that the rear-side vertically extending portion is opposed to the front-side vertically extending portion with a predetermined distance interposed therebetween; and a connecting portion which is constituted by a proximal end part of the front portion of the plate member that extends in the frontward and backward direction on a back side of the rear-side vertically extending portion and which connects, integrally to the rear portion of the plate member, a posterior surface of the rear-side vertically extending portion at a point thereof having a height position different from a height position of a connecting point of an anterior surface of the rear-side vertically extending portion at which the rear-side vertically extending portion is connected to the horizontally extending portion, and wherein the front portion of the plate member is constituted by including, at the leading end part thereof, a U-shaped portion having a U-shaped configuration in vertical cross section.

2. The apparatus according to claim 1, wherein the front-side vertically extending portion is bent at substantially right angles at a plurality of locations of a middle portion thereof as seen in a height direction thereof, so as to extend in the vertical direction in a staircase-like form.

3. The apparatus according to claim 1, wherein reinforcing portions for increasing strength of the front portion of the plate member are provided on the front portion, so as to prevent easy deformation of the front portion due to an impact load applied thereto resulting from collision of the leg portion of the pedestrian with the front face of the vehicle.

4. The apparatus according to claim 3, wherein the reinforcing portions are constituted by reinforcing ribs formed integrally on the front portion of the plate member such that the reinforcing ribs are integral with a posterior surface of the front-side vertically extending portion and a posterior surface of the rear-side vertically extending portion, so as to extend in the frontward and backward direction.

5. The apparatus according to claim 1, wherein said front portion terminates at a lower end of said front-side vertically extending portion.

6. A pedestrian protection apparatus for a vehicle, comprising a plate member which is disposed at a lower part of a front face of the vehicle so as to extend in a frontward and backward direction of the vehicle with a predetermined width, which is made of a synthetic resin, which includes a front portion and a rear portion, and which is fixed at the rear portion to the vehicle with at least a leading end part of the front portion protruded from the front face of the vehicle, the apparatus being arranged to sweep a leg portion of a pedestrian that has collided with the front face of the vehicle by contact of the leading end part of the front portion of the plate member with the leg portion of the pedestrian, thereby protecting the leg portion of the pedestrian, wherein the plate member includes: a front-side vertically extending portion which is located at the leading end part of the front portion of the plate member so as to vertically extend over an entire width of the plate member; a plurality of rear-side vertically extending portions which are located at the back of the front-side vertically extending portion with a predetermined distance interposed therebetween so as to extend in the vertical direction over the entire width of the plate member such that the plurality of rear-side vertically extending portions are opposed to the front-side vertically extending portion and spaced apart from each other by a predetermined distance in the frontward and backward direction; a plurality of horizontally extending portions which are located between mutually corresponding vertical ends of a forwardmost one of the plurality of rear-side vertically extending portions and the front-side vertically extending portion and between mutually corresponding vertical ends of the plurality of rear-side vertically extending portions, such that the plurality of horizontally extending portions horizontally extend over the entire width of the plate member and such that adjacent two of the plurality of horizontally extending portions in the frontward and backward direction are located at mutually different height levels, thereby connecting the front-side vertically extending portion and the forwardmost one of the plurality of rear-side vertically extending portions integrally to each other and connecting the plurality of rear-side vertically extending portions to each other; and a connecting portion which is constituted by a proximal end part of the front portion of the plate member that is located on a back side of a rearmost one of the plurality of rear-side vertically extending portions so as to extend in the frontward and backward direction and which connects, integrally to the rear portion of the plate member, a posterior surface of the rearmost one of the plurality of rear-side vertically extending portions at a point thereof having a different height position from that of a connecting point of an anterior surface of the rearmost one of the plurality of vertically extending portions at which the rearmost one of the plurality of vertically extending portions is connected to a corresponding one of the plurality of horizontally extending portions, and wherein the leading end part of the front portion of the plate member extends in a zigzag form in a height direction with a U-shaped configuration in vertical cross section.

7. The apparatus according to claim 6, wherein the front-side vertically extending portion is bent at substantially right angles at a plurality of locations of a middle portion thereof as seen in a height direction thereof, so as to extend in the vertical direction in a staircase-like form.

8. The apparatus according to claim 6, wherein reinforcing portions for increasing strength of the front portion of the plate member are provided on the front portion, so as to prevent easy deformation of the front portion due to an impact load applied thereto resulting from collision of the leg portion of the pedestrian with the front face of the vehicle.

9. The apparatus according to claim 8, wherein the reinforcing portions are constituted by reinforcing ribs formed integrally on the front portion of the plate member such that the reinforcing ribs are integral with a posterior surface of the front-side vertically extending portion and a posterior surface of the rear-side vertically extending portion, so as to extend in the frontward and backward direction.

* * * * *